(12) United States Patent
Schlom et al.

(10) Patent No.: US 6,385,987 B2
(45) Date of Patent: May 14, 2002

(54) HEAT EXCHANGER FOR COOLING AND FOR A PRE-COOLER FOR TURBINE INTAKE AIR CONDITIONING

(76) Inventors: Leslie Schlom, 5824 Saloma Ave., Sherman Oaks, CA (US) 91411; Andrew J. Becwar, 518 Old Landmark La., La Canada, CA (US) 91011

( * ) Notice: Subject to any disclaimer, the term of this patent is extended or adjusted under 35 U.S.C. 154(b) by 0 days.

(21) Appl. No.: 09/792,780

(22) Filed: Feb. 23, 2001

Related U.S. Application Data

(60) Provisional application No. 60/184,255, filed on Feb. 23, 2000.

(51) Int. Cl.[7] ................................................. F28D 5/00
(52) U.S. Cl. ........................ 62/304; 62/314; 261/112.2
(58) Field of Search ................. 62/304, 314; 261/112.2, 261/DIG. 11; 95/211; 96/299

(56) References Cited

U.S. PATENT DOCUMENTS

| | | |
|---|---|---|
| 2,732,190 A | 1/1956 | Mart |
| 2,839,153 A | 6/1958 | Mollner |
| 3,267,648 A | 8/1966 | Allcorn, Jr. |
| 3,712,026 A | 1/1973 | Griffiths et al. |
| 3,775,993 A | 12/1973 | Murphy |
| 4,022,853 A | 5/1977 | Schulenberg |
| 4,023,949 A | 5/1977 | Schlom et al. ................. 62/309 |
| 4,107,940 A | 8/1978 | Schlom et al. ................. 62/121 |
| 4,112,027 A | 9/1978 | Cates ........................ 261/151 |
| 4,137,058 A | 1/1979 | Schlom et al. ................. 62/121 |
| 4,156,351 A | 5/1979 | Schlom et al. ................. 62/121 |
| 4,269,796 A | 5/1981 | Glicksman et al. |
| 4,312,646 A * | 1/1982 | Fattinger et al. .............. 55/218 |
| 4,361,426 A | 11/1982 | Carter et al. |
| 4,380,910 A * | 4/1983 | Hood et al. ................... 62/91 |
| 4,418,527 A | 12/1983 | Schlom et al. .............. 60/39.05 |
| 4,499,031 A * | 2/1985 | Sexton et al. ................. 62/314 |
| 4,544,513 A | 10/1985 | Otterbein .................... 261/153 |
| 4,566,290 A | 1/1986 | Otterbein ..................... 62/304 |
| 4,660,390 A | 4/1987 | Worthington ................. 62/309 |
| RE32,461 E | 7/1987 | Di Peri ........................ 62/314 |
| 4,708,000 A | 11/1987 | Besik ......................... 62/480 |
| 4,827,733 A | 5/1989 | Dinh .......................... 62/305 |
| 4,926,656 A | 5/1990 | Hickley et al. |
| 4,950,430 A | 8/1990 | Chen et al. |
| 4,970,876 A | 11/1990 | Vinokurov |
| 5,003,961 A | 4/1991 | Besik ......................... 126/110 |
| 5,076,347 A | 12/1991 | Fogleman .................... 165/118 |
| 5,187,946 A | 2/1993 | Rotenberg et al. ............ 62/314 |
| 5,193,352 A | 3/1993 | Smith et al. ................... 62/90 |
| 5,227,054 A | 7/1993 | Gyulavari et al. |
| 5,242,627 A | 9/1993 | Lundin |

(List continued on next page.)

FOREIGN PATENT DOCUMENTS

WO   WO 98/51916   11/1998   ........... F02C/7/143

Primary Examiner—William E. Tapolcai
Assistant Examiner—Mohammad M Ali
(74) Attorney, Agent, or Firm—Fulbright & Jaworski

(57) ABSTRACT

Novel heat exchangers and methods of constructing the heat exchangers for use in indirect evaporative cooling applications. The evaporative apparatus for cooling comprises both a multi-stage indirect evaporative cooling heat exchanger; and a multi-stage sump where each sump stage, in a one-to-one relationship. Other multistage heat exchangers with their associated multistage sumps can be combined, with the cooled air of a first multistage evaporative assembly feeding into the intake end of a second multistage evaporative assembly, and so on. These heat exchangers can be used for comfort and industrial applications cooling. The invention can be an entire assembly for the pre-cooling and cleaning of the air going to a gas turbine or any other air breathing device, with an air washer stage in which air is directly cooled by evaporation and where simultaneously the air is also cleaned of dust, dirt and other impurities.

40 Claims, 21 Drawing Sheets

U.S. PATENT DOCUMENTS

| | | |
|---|---|---|
| 5,312,464 A | 5/1994 | Gay |
| 5,349,829 A * | 9/1994 | Tsimerman ................... 62/314 |
| 5,392,944 A | 2/1995 | Jennings ...................... 220/571 |
| 5,555,742 A * | 9/1996 | Kelley ........................... 62/314 |
| 5,660,048 A | 8/1997 | Belding et al. ................. 62/94 |
| 5,664,433 A | 9/1997 | Bourne et al. ................. 62/314 |
| 5,727,394 A | 3/1998 | Belding et al. ................. 62/94 |
| 5,879,434 A | 3/1999 | Kiss |
| 5,927,097 A * | 7/1999 | Wright .......................... 62/314 |
| 6,003,327 A | 12/1999 | Belding et al. ................ 62/271 |
| 6,050,100 A | 4/2000 | Belding et al. ................ 62/271 |

* cited by examiner

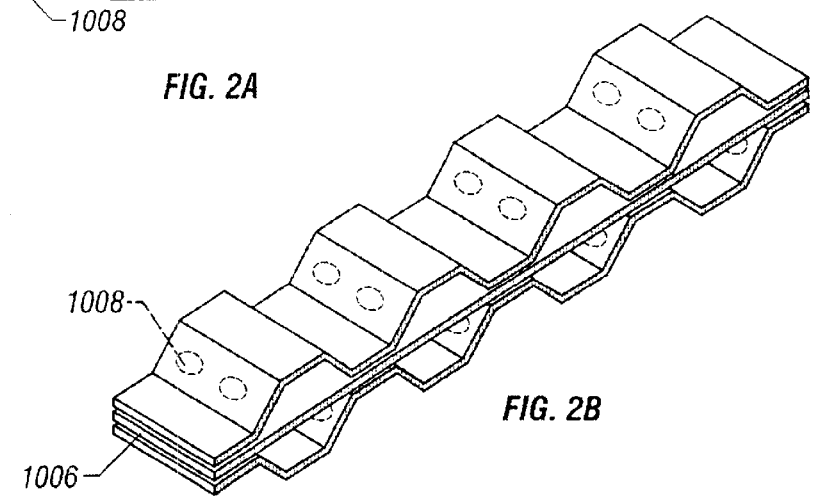
FIG. 2A
FIG. 2B
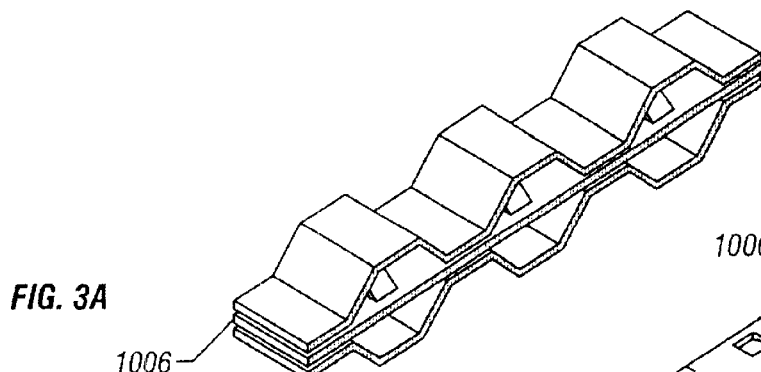
FIG. 3A
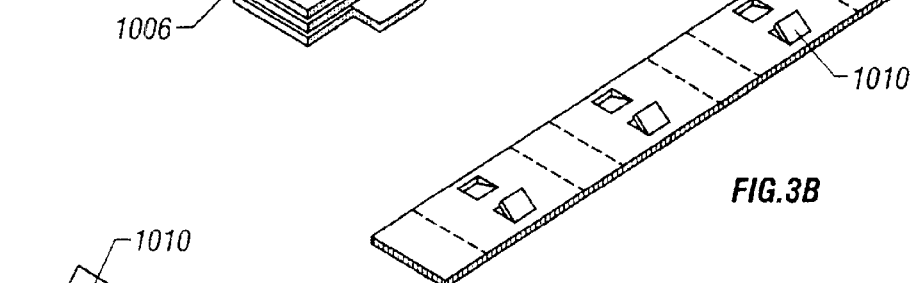
FIG. 3B
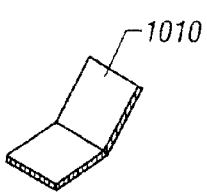
FIG. 3C
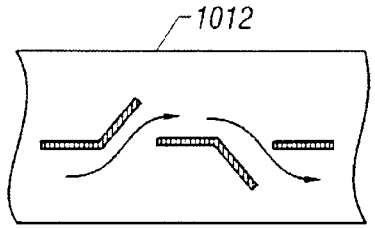
FIG. 3D

HEAT EXCHANGER FOR COOLING AND FOR A PRE-COOLER FOR TURBINE INTAKE AIR CONDITIONING This application claims the benefit of Provisional Application No. 60/184,255 filed Feb. 23, 2000.

FIELD OF THE INVENTION

The invention relates to a method and apparatus for increasing the density of air being used in a compression process such as air compressors, gas turbines and other processes where the increase of air density is important. This invention also relates to a method and apparatus for reducing the temperature of air. It relates to air-conditioning. It relates to heat exchangers.

BACKGROUND

Indirect evaporative cooling invented in the mid-seventies (see, for example, Schlom, et al., U.S. Pat. No. 4,023,949) uses the latent heat of the evaporation of water to remove heat from the air. Direct evaporative coolers on the other hand, also known as swamp coolers, cool the air by passing the air through wet pads by which the evaporative absorption of the latent heat of evaporation by the water directly cools the air. Since the water vapor evaporates directly into the air, the air ends up with a heavy load of moisture. With a third approach, direct refrigeration, the air passes through a heat exchanger where it evaporates a refrigerant such as freon. The latent heat of evaporation of the freon acts on the air through a heat exchanger to cool the air. To recycle the freon additional energy is used to compress and condense the freon vapor back to a liquid, which can then be evaporated all over again. Indirect evaporation evaporates water instead of freon in the heat exchanger. Another difference is that the water vapor is not recaptured and condensed back to the liquid state, as is freon, for example, in the refrigeration case. Therefore the energy use efficiency is increased in the indirect evaporative process because no energy is expended on the condensation of the refrigerant part of a refrigeration process.

Traditionally, gas turbine intake systems depend upon the density of air to increase efficiency. Three methods, historically, to increase gas turbine intake efficiency include steam injection, refrigeration, and direct evaporative cooling. A less expensive approach to increasing the intake air density by cooling, other than these historical methods, is an indirect evaporative approach. Prior patents in this area include Schlom et al.: U.S. Pat. Nos. 4,023,949; 4,107,940; 4,137,058; 4,156,351 and 4,418,527; Fogelman: 5076347; and Kopko: WO9851916A1.

Areas in which additional increased efficiency of the indirect evaporative cooling, or the "Everest Cycle" (U.S. Pat. No. 4,0233,949), might be improved include (a) better heat exchange process, (b) better water evaporation process, and (c) bringing the "room inlet dry-bulb" as close as possible to the "exhaust air wet-bulb temperature" so as to increase the thermodynamic efficiency of the actual process.

SUMMARY OF THE INVENTION

The present invention comprises novel heat exchangers and methods of constructing the heat exchangers for use in indirect evaporative cooling applications. The heat exchanger is useful for both single and multiple unit (where a plurality of heat exchangers are back-to-back) indirect evaporative processes. The evaporative apparatus for cooling comprises both a multi-stage indirect evaporative cooling heat exchanger; and a multi-stage sump where each sump stage, in a one-to-one relationship with a stage of the multi-stage heat exchanger has sump water at progressively cooler temperatures as one progresses further into the heat exchanger. Because there are separate stages of the heat exchanger and the water sumps, progressive cooling is induced on dry side output air. Other multistage heat exchangers with their associated multistage sumps can be combined, with the cooled air of a first multistage evaporative assembly feeding into the intake end of a second multistage evaporative assembly, and so on.

As a multi-stage process, for n stages, as n approaches infinity, the thermodynamic efficiency may approach a maximum, since the entropy production $dS=\Sigma dq/T$ may be minimized (S=entropy, dq=heat transferred at temperature T). This is the case where the operational cycle of the multi-stage process is as close to a reversible process as possible. In actual practice most of the thermodynamic efficiency gain may be achieved with four to six stages.

These heat exchangers can be used for comfort cooling, pre-cooling of intake air for gas turbines and for supplying cooling air for other applications such as electrical generators and lubricating oil coolers. As a comfort, or other cooler, the present invention may be used as either a stand-alone cooling unit or as a precooler for another air conditioning device where it precools the ambient air.

As an application, the indirect-direct evaporative apparatus can be considered as an entire assembly for the pre-cooling and cleaning of the air going to a gas turbine or any other air-breathing device. As such, an additional stage is included, viz., an air washer stage in which air is directly evaporatively cooled and where simultaneously the air is also cleaned of dust, dirt and other impurities.

BRIEF DESCRIPTION OF THE DRAWINGS

The above and other features and advantages of the invention will be more apparent from the following detailed description wherein:

FIG. 2A schematically depicts a polygonal plate with deformations to induce air turbulence, i.e., embossed "turbulators" on the heat exchanger plates;

FIG. 2B shows a plate assemblage with deformations to induce air turbulence;

FIG. 3A shows a plate assemblage with tabs to induce air turbulence;

FIG. 3B shows an intermediate plate with tabs to induce air turbulence;

FIG. 3C shows a detail of an individual tab;

FIG. 3D a detail depicting a section of an intermediate plate, as in FIG. 3B, showing an associated airflow, as a consequence of a tab in an intermediate plate;

DETAILED DESCRIPTION OF THE PREFERRED EMBODIMENT

The following description is of the best mode presently contemplated for carrying out the invention. This description is not to be taken in a limiting sense, but is merely made for the purpose of describing the general principles of the invention. The scope of the invention should be determined with reference to the claims.

Figure 1A:
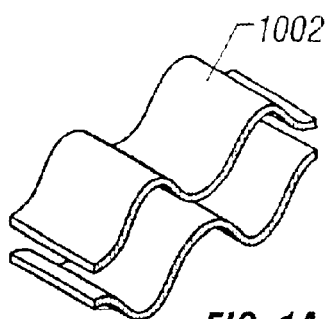
FIG. 1A schematically depicts heat exchanger plates used in this invention, in particular a sinusoidal plate type.
Figure 1B:
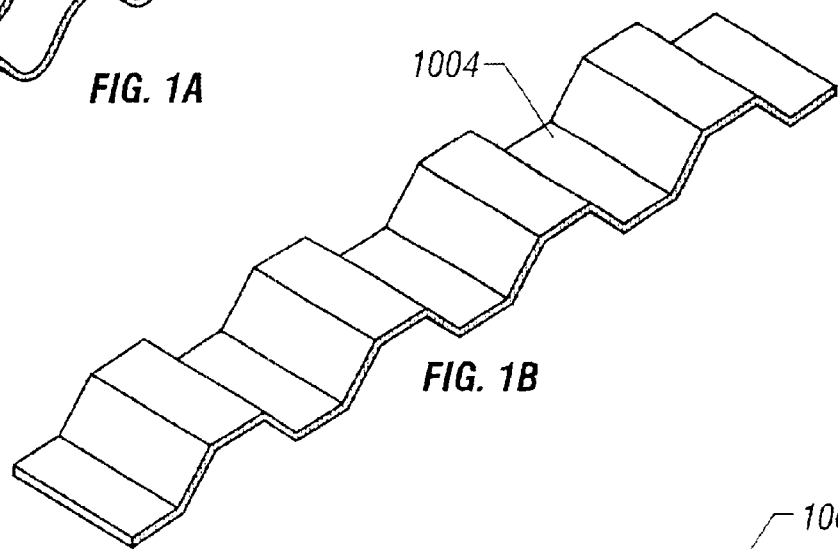
FIG. 1B schematically depicts heat exchanger plates used in this invention, in particular a polygonal plate type.
Figure 1C:
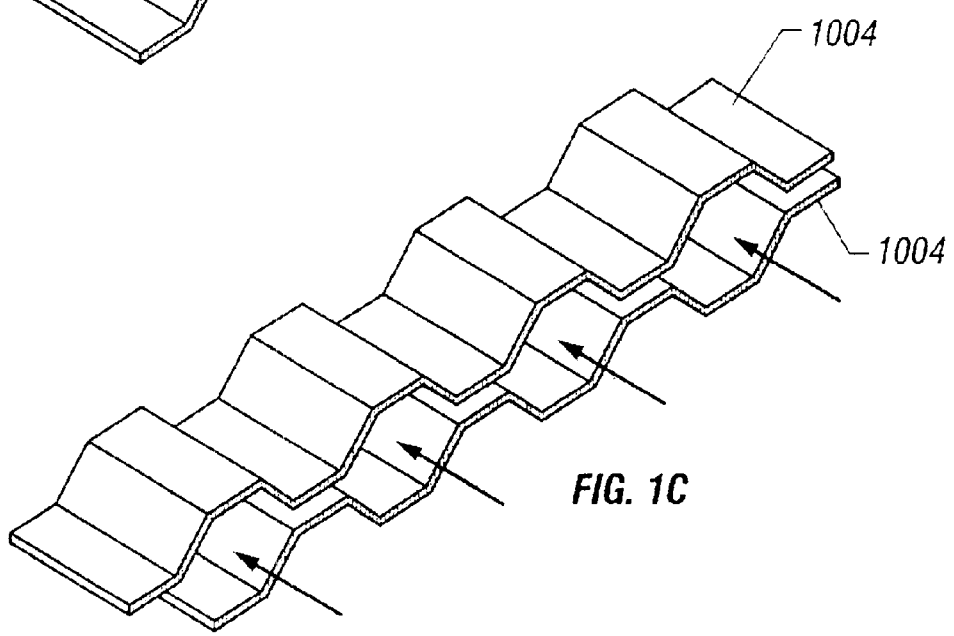
FIG. 1C schematically depicts heat exchanger plates used in this invention, in particular, an assembly of two polygonal plates to form an airflow path.
Figure 1D:
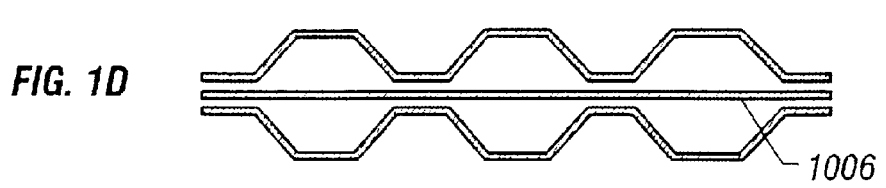
FIG. 1D schematically depicts heat exchanger plates used in this invention, in particular, the assembly of 1C with the inclusion of an intermediate plate.

The item call-out numbers and description are listed below for reference:

Item No. Description
1002 Sinusoidal plates.
1004 Polygonal plates.
1006 intermediate in assemblage of FIG. 1D.
1008 Deformed portion of plate to induce turbulence.
1010 Tabs and /or deformations to induce turbulence.
1012 Section of intermediate plate with deformations causing airflow to change direction.
1014 Dry side air path (primary air).
1016 Wet side air path (secondary air).
1018 Dry side air—leaving.
1020 Wet side air—leaving.
1022 Wet side fan/s
1024 Foundation (base).
1026 Sump/s.
1028 Spray manifold.
1030 Water Inlet.
1032 Float valve.
1034 Water line from float valve to first sump.
1036 Sump
1038 Water transfer pipe.
1040 Overflow /drain pipe.
1042 Screens.
1044 Spray manifold—Air Washer.
1046 Cover, Air Washer—primary media.
1048 Cover, Air Washer—secondary media.
1050 Primary evaporative media.
1052 Secondary evaporative media.
1054 Distribution pump—primary media.
1056 Distribution pipe—secondary media.
1058 Pump spray manifold—Air Washer
1060 Pump/s primary and secondary media.
1062 Pipe from pump to spray manifold.
1064 Pipe from pump/s to media distribution pipes.
1066 Access panel
1068 Housing.
1070 Moisture eliminator
1072 Airflow path from primary to secondary air (indirectly cooled air now goes to the wet side of the next stage).
1074 Heat exchanger assembly.
1076 "n" series unit and components.
1078 Plate separator with holes—end view.
1079 Plate separator with holes—side view.
1080 Plate separator with slats (louvers)—end view.
1081 Plate separator with slats (louvers)—side view.
1082 Plate separator of reticulated foam—end view.
1083 Plate separator of reticulated foam—side view.
1084 Plate separator, solid—end view.
1085 Plate separator, solid—side view.
1086 Strainer for pump/s.
1088 Intake air hood.
1090 Intake air filters.
1092 Framework (structure).
1094 A–B Air flow through heat exchanger to plenum.
1094 B–C Air flow downward in plenum.
1094 C–D Air flow from plenum into sump area.

1094 D–E Air flow upward through wet side of heat exchanger to atmosphere.

1096 Air discharge housing.

1098 Plenum (this is where air which has been indirect evaporatively cooled leaves the dry side of the heat exchanger and then enters the wet side of the next stage).

The new heat exchanger design utilizes plates or sheets of material in either a or a sinusoidal 1002 shape (FIG. 1A) or a polygonal 1004 shape (FIG. 1B) in cross section, either one of which closely approximates a repeating wave form. The plates 1004 (FIG. 1C) may be arranged in pairs forming channels for air flow; the arrows in FIG. 1C indicate the air flow. Optionally, as an enhancement of the heat exchanger, pairs of plates may optionally utilized an intermediate plate 1006 to separate the plate pair and to provide a uniformly shaped channel between them. The purpose of this intermediate plate 1004 (FIG. 1D) is to form another heat transfer surface, transferring heat between the center of the airflow and the polygonal walls.

The plates may be fabricated from one or more of a number of materials. Any thermally conductive material may be a candidate. Without limiting or restricting the material or materials of which the sheets of material might be fabricated, a number of candidate materials are nevertheless listed. These include steel, galvanized iron, galvanized steel, stainless steel, thermally conductive plastic, thermally conductive ceramic, metal coated with paint, metal coated with varnish, metal coated with plastic, metal coated with ceramic, metal coated with glass, metal coated with diamond-like coating, titanium, thermally conductive composite, aluminum, magnesium, copper or silver.

Since turbulent air flow over a water surface can increase the evaporation rate for a given net air flow rate, increased roughness and vortex generators are used to increase the turbulence of the air flowing over the water film as the water film itself gravitationally flows down toward a sump. Extrapolation of known data of ocean surface roughness related to evaporation rates yields a factor of three or more for the rate of increased evaporation for turbulent air flow compared to a laminar type of air flow over a smooth ocean.

Another use of this intermediate plate is to provide a support surface for tabs and fins which help enable turbulence in the air flowing over them. The turbulence will improve the heat transfer by changing the laminar flow to turbulent flow.

One method of initiating turbulence in the air flow is the use of irregularities (1008, FIG. 2A) mechanically or otherwise produced on the surface of the preformed sheets 1002 (FIG. 1A), 1004 (FIG. 1B) used to produce the "pairs" (FIG. 1C). The roughness of these irregularities gives rise to a mixing length of increased turbulent vertical mixing into the airflow. These irregularities can be produced either by embossing the material 1008 (FIG. 2A, 2B) or by mechanically attaching tabs, fins 1010 (FIG. 3A, 3B, 3C) or "turbulators", to which these tabs, fins, embossments and bumps will be generically referred. The embossments 1008 (FIG. 2A) may be applied to the inside of the outer walls of the plate pair channels as shown in FIGS. 2A and 2B.

The tabs 1010 (FIG. 3B) are shown formed on an intermediate plate 1006. FIG. 3A shows the assembly as in FIG. 1D, but with the intermediate plate 1006 having tabs 1010. The turbulators act on the process air flow produce vortex eddies and breakup the laminar flow. FIG. 3D shows an air flow condition (arrows) 1012 on a tab 1010 on an intermediate plate 1006.

Bumps or tab-like elements can also be added from any material compatible with the basic structure. These may include such materials as sintered metal powder and foamed metal, which, when applied act to increase surface roughness, and may also act to increase the total wetted surface. For many of the tabs or bumps, water flowing gravitationally down a channel may encounter a vertex or edge of a tab, bump or other attached material, and may fall off that object as a droplet, with the potential to provide a greater evaporation ratee, as a droplet will expose more surface area. The net effect of introducing methods and devices for producing turbulence is to increase the efficiency of operation of the overall apparatus.

Figure 4A:
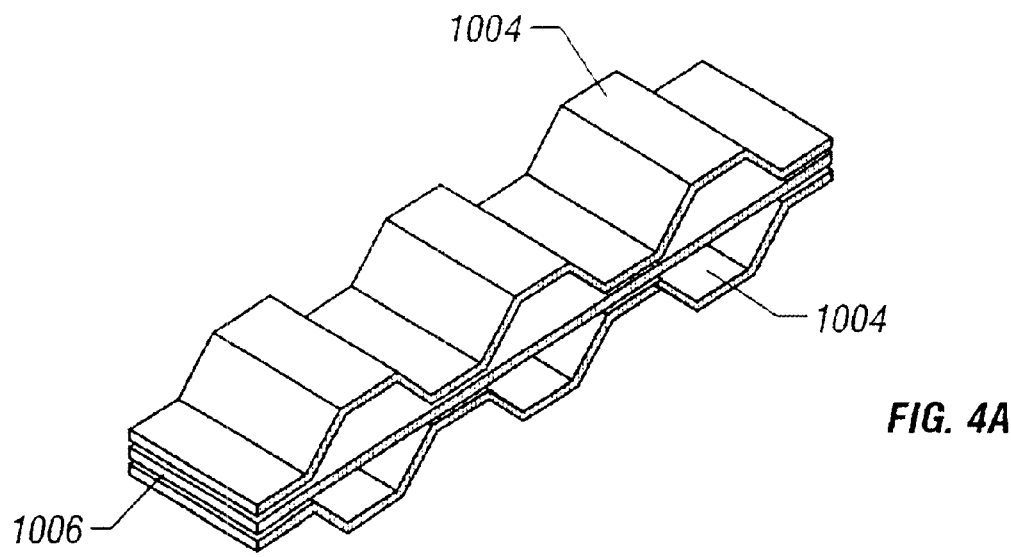
FIG. 4A shows a plate assembly without tabs or deformations.
Figure 4B:
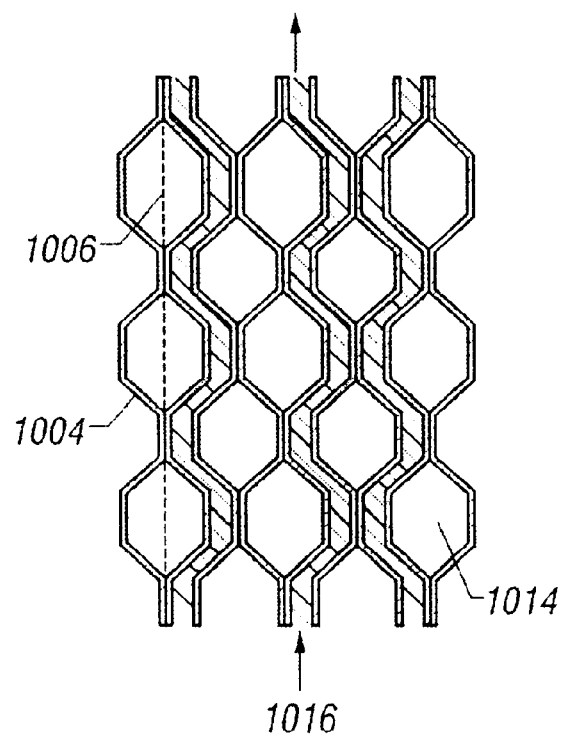
FIG. 4B is an end view of a portion of a heat exchanger, showing dividers.

FIG. 4A shows an assembly of polygonal plates 1004 and the optional intermediate plate 1006. FIG. 4B shows several assemblies as in FIG. 4A further assembled into a heat exchanger with polygonal plates 1004, intermediate plate 1006 dividers, and also shows the dry side air path (primary air) 1014 and the wet side air path (secondary air) 1016.

Figure 5:
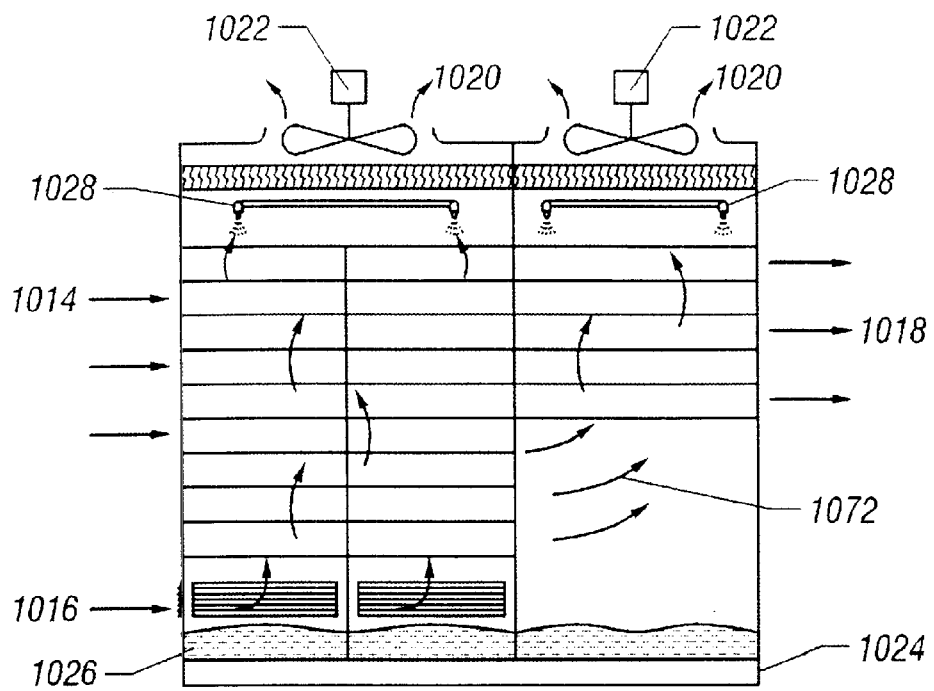
FIG. 5 shows a schematic section of two-stage indirect evaporative cooler showing airflow paths.

FIG. 5 shows a schematic section of the two-stage version of the indirect evaporative cooler, showing airflow paths. FIG. 5 shows the dry side (primary) air path 1014, the wet side (secondary) air path 1016, the dry side air leaving 1018 the unit, the wet side air leaving 1020 and the airflow path from the primary to the secondary air 1072. The two-stage version of the evaporative cooler sits on a base 1024, which supports sumps 1026 which collects water cascading down the cooler which is sprayed by the spray manifold 1028. The wet side air 1016, 1020 is drawn out by the wet side fans 1022.

Figure 6:
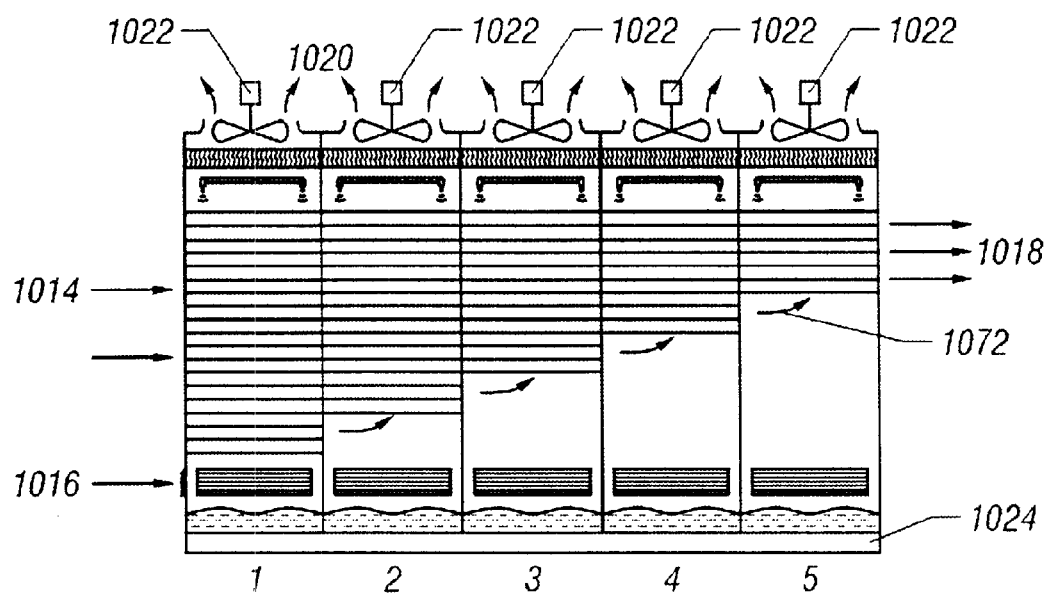
FIG. 6 shows a schematic section of multistage ("n"-series) indirect evaporative cooler showing airflow paths.

FIG. 6 shows a schematic section of an n-stage (five stages are shown) indirect evaporative cooler. The incoming dry side (primary) air 1014 enters from the left of FIG. 6 and ultimately exits 1018 on the right. The wet side air 1016 enters from the bottom (left) and some exits through the top 1020, drawn up by the wet side fans 1022.

However, in the n-stage process, some of the dry side air, at each stage, is redirected into the wet side air, at a next successive stage. Consequently, the already cooled dry side air becomes the wet-side air, resulting in a lower temperature wet side air with a lower wet side dew point temperature. The effect, as will be seen, is to efficiently cool the dry side air which exits 1018 to a lower temperature air stream with a higher air density. The coldest dry-side 5002 (FIG. 5) is being cooled by the coldest water and the coldest air with the lowest wet bulb temperature.

Figure 7:
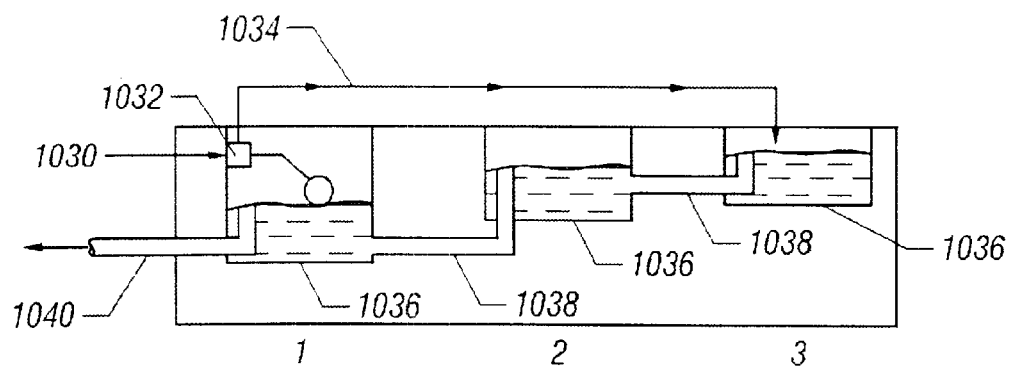
FIG. 7 shows a schematic section of cascaded sumps.

Another advantageous feature of this embodiment of the heat exchanger is to provide separate, distinct sumps 1036, 1036, 1036 (FIG. 7) for the water utilized on the "wet side" of the heat exchanger. The separate sumps maintain the coldest water on the leaving side of the heat exchanger. Additionally, these sumps can be arranged in a "cascade" fashion (FIG. 7, 1036, 1036, 1036) where the water flows from the coldest sump 1036 on the right to the warmest sump, 1036 on the left.

A float valve 1032 regulates the refilling of the coldest sump 1036 on the right, as required, by the level in the warm-side sump 1036 on the left. When the level in the sump 1036 on the left falls, the float valve 1032 allows water to enter from the water inlet 1030. The water line 1034 from the float valve to the first sump 1036 on the right, allows the first sump to be refilled according to the level of the last sump (1036 on the left). Water transfer pipes 1038 and an overflow (and drain) pipe 1040 complete the sump system.

Each separate sump sits at the bottom of separate spray systems 1028 (FIG. 5) with separate pumps that supply each separate spray and sump unit. In the preferred embodiment the first sump 1036 (on the right) would be at the air washer, or, at the last heat exchanger, if a direct evaporative stage were not used. In this embodiment water is supplied to the direct evaporative stage only and then flows down to the lowest sump where any excess water is discharged. Also, at this point sufficient "bleed" 1040 will be employed to maintain a low concentration of dissolved solids in the water to prevent the build-up of dissolved solids on the walls of the heat exchanger. Because the different sumps are sufficiently thermally insulated, and the air progressing through each partition or stage, is tending to be cooler than the previous stage or partition, the temperature of the thermally graded sumps both reflect this increased cooling and contribute to it.

Figure 8A:
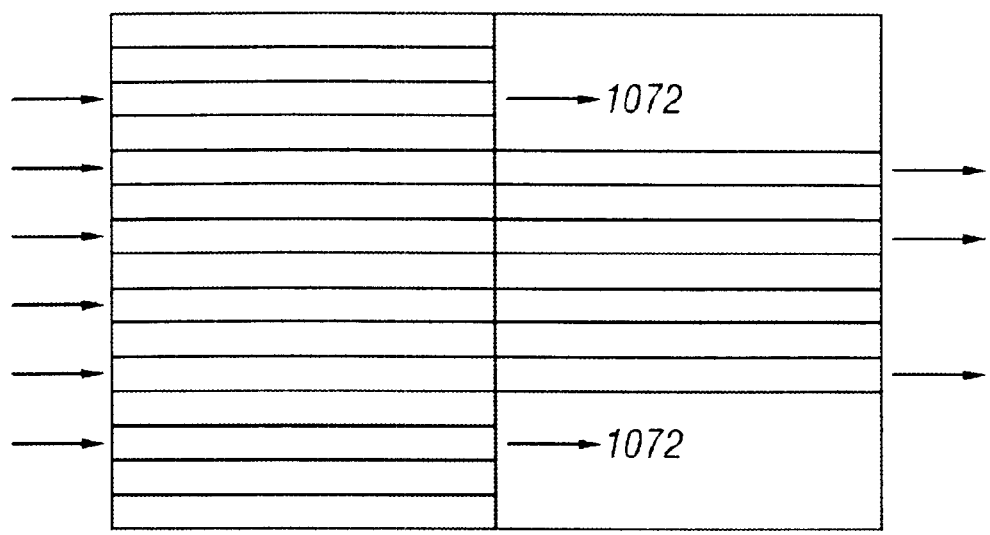
FIG. 8A shows a schematic top view of an indirect evaporative cooler with first indirect stage on sides.
Figure 8B:
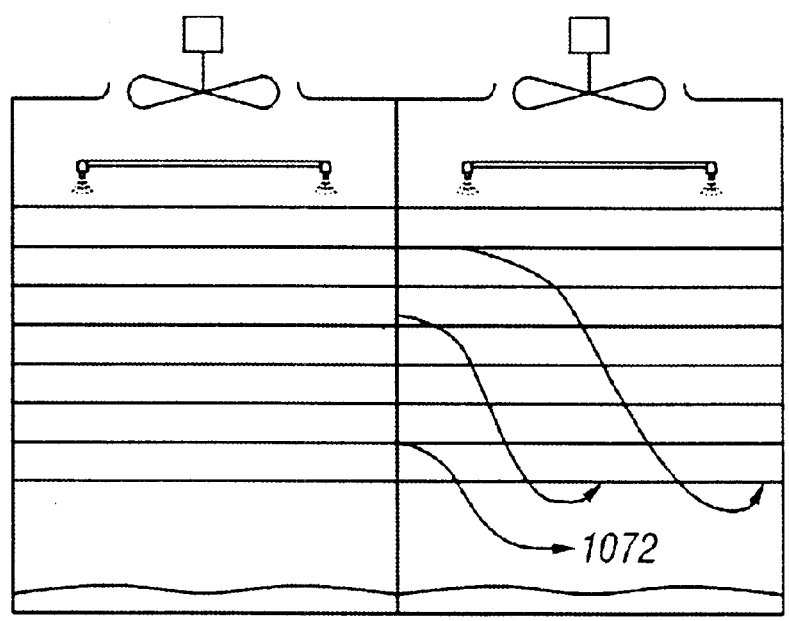
FIG. 8B Schematic side view of an indirect evaporative cooler with first indirect stage on sides.

A unique feature of the heat exchanger is that it provides for a portion of the air to be first indirectly evaporatively cooled and then used 1072 (FIGS. 8A, 8B) for the wet side of the final portion of the heat exchanger. FIG. 8A shows a schematic top view of an embodiment of the indirect evaporative cooler with a first indirect stage on the sides. FIG. 8B shows a schematic side view of an embodiment of the indirect evaporative cooler with a first indirect stage on the sides.

Advantageously, this process within the heat exchanger itself significantly improves performance. Previous technology utilized separate heat exchangers to achieve this process. The air tends to evaporate the water. The water changes from a liquid to a vapor state, which requires a gain of molecular kinetic energy. This gain of molecular kinetic energy is at the expense of the remaining water, which loses that amount of energy, expressed as the latent heat of evaporation. Thus, the temperature of the unevaporated water and the heat exchange surfaces in contact with it reflect some decrease in their molecular kinetic energy (conservation of energy). The decreased molecular kinetic energy is (expressed as) a decreased temperature. A wet-bulb temperature is that temperature to which a fully aspirated thermometer would fall due to the evaporation from water which is continuously supplied to it by a wetted wick. In order to further cool that wet bulb thermometer, one needs to bring it in contact with matter that is at a lower temperature. Then, sensible heat is transferred from the thermometer to the colder matter. The sensible heat transfer is in the form of the thermometer's higher kinetic energy molecules transferring kinetic energy to the lower kinetic energy matter. This transfer of sensible heat can then lower the thermometer's temperature below the wet bulb temperature, if the temperature of the colder matter is below the thermometer's wet bulb temperature. Air from the dry side which has been cooled toward the wet bulb temperature of the wet side air has a lower dry bulb temperature.

If one places an imaginary box around the n-stage heat exchanger, one may examine aspects of its efficiency. The wet side air process is evaporating water. The evaporation is a change of phase and takes place isothermally. For an amount of (latent) energy equal to L released, some amount is absorbed by the dry side air, L–dL. The quantity dL represents energy loss not transferred to the dry air. The amount of entropy transferred in from the ambient temperature wet side air flow is: $L/T_{ambient}$ while the entropy carried out by the dry side air is $(L-dL)/(T_{ambient}-dT)$ since the dry side air has been sensibly cooled. The difference is then: heat absorbed at the higher temperature minus the heat rejected at a lower temperature, or, $$(T_{ambient} \, dL - L \, dT)/(T_{ambient} \, (T_{ambient} - dT)).$$

Where the latent heat loss (dL) is kept as small as feasible, the determining factor is LdT. Since L is a constant, the difference between the temperature at the wet side air and the dry side air flow (dT) determines the efficiency of the process. The smaller dT, the more efficient the process. In the multistage process, dT is automatically kept small by utilizing some of the cooled dry air flow for the next stage of the wet side cooling.

Figure 9:
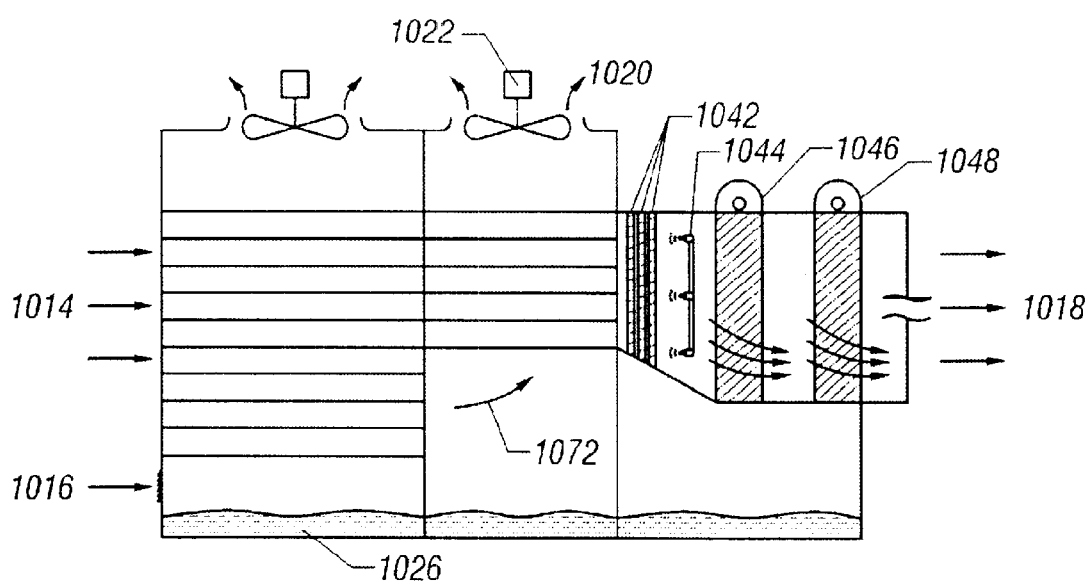
FIG. 9 shows a schematic section of multi-stage indirect evaporative cooler with an air washer operating thermodynamically and psychometrically according to the Schlom Cycle.

FIG. 9 shows a schematic section of multi-stage indirect evaporative cooler with an air washer operating thermodynamically and psychometrically according to the Schlom Cycle. The dry air 1014 enters from the left; the wet air 1016 enters from the left bottom. Some of the cooled dry air is used 1072 on the wet side of the next stage. The separate sumps 1026 are fairly thermally isolated from each other. The final, cool dry air 1018 exits on the right to be used, for example, in an electric generating gas turbine. Screens 1042 are placed in the air stream 1018. Spray manifolds 1044 provide the washing of the air. There is a cover 1046 for the primary media and a cover for 1048 the secondary media.

Figure 10:
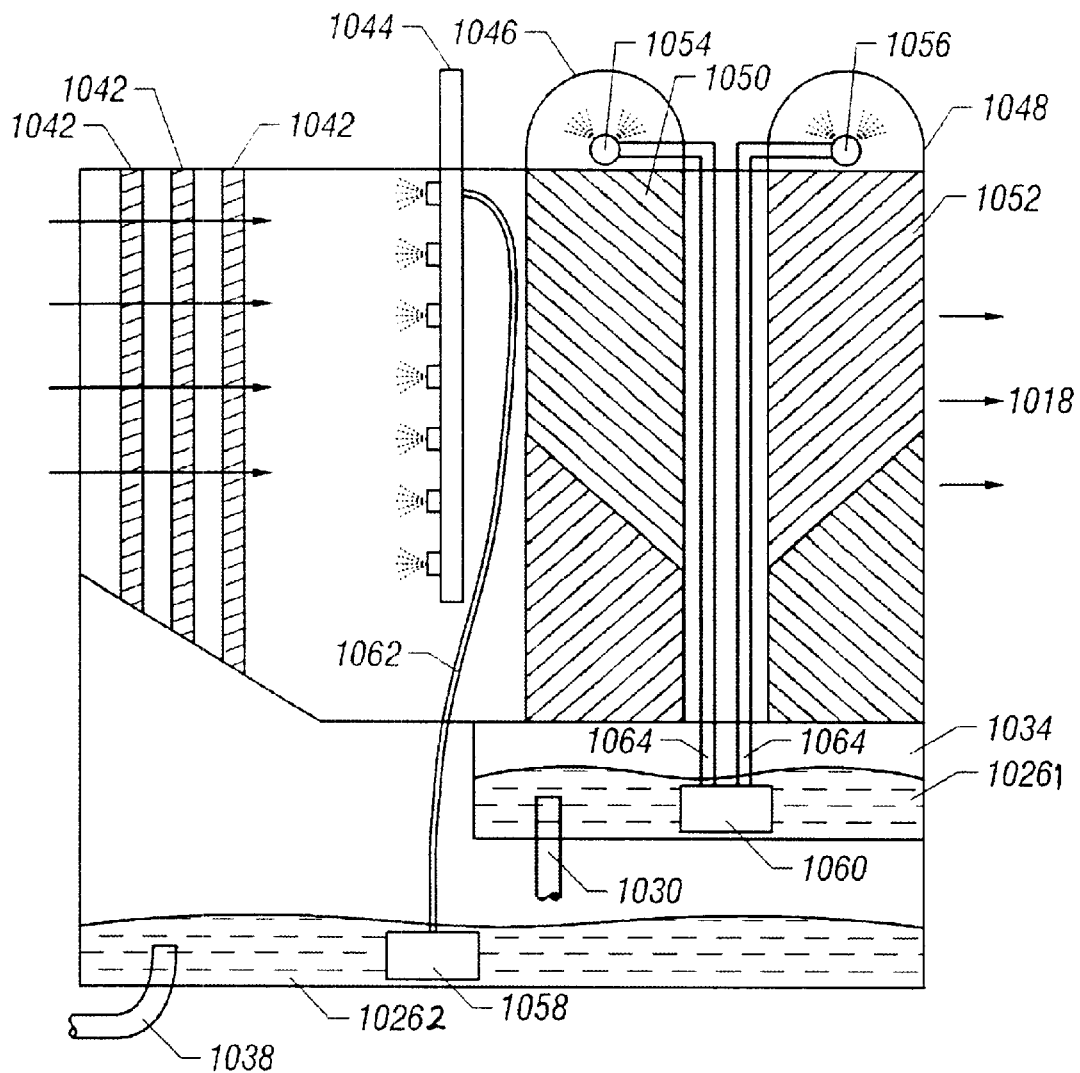
FIG. 10 shows a schematic section of the air washer.

FIG. 10 shows a schematic section of an air washer operating thermodynamically and psychometrically according to the Schlom Cycle. The air washer is the final stage in this indirect-direct evaporative process. It represents a direct evaporative mode. In the air washer, the air receives its final cooling and is also thoroughly cleansed of dirt and pollutants of all types. The air washer consists of two sub-stages. The first sub-stage is a spray section 1044 where the air must pass through a deluge of fine spray (not mist) 1044. The second, final, sub-stage comprises two media type sub-stages 1046, 1048. In these two media type substages clean flowing water 1054 (distribution pipe for the primary media), 1056 (distribution pipe for the secondary media) removes any dirt that may have gotten through the previous stages. Also, that clean flowing water 1054, 1056 will re-dissolve any salts that may have been entrained in the evaporation in the previous stages.

In the first air washer sub-stage, the nozzles 1044 (FIG. 10) are supplied with clean water, which has been cleansed by use of ten-micron filtration. In this preferred embodiment, this water can be at normal line pressure (50–70 psi) or can be supplied from the sump by means of a pump at pressures as low as 5–10 psi. Any workable pressure range may be utilized. Screens 1042 in this air stream are also employed to further breakup the droplets. The spray manifold 1044 directs its water droplet spray into the screens 1042 where they tend to be broken into smaller spay droplets by hitting the screens with the dry air flow (1018-arrows shown but not number) entering from the left.

FIG. 10 shows a schematic section of the air washer including the pump spray manifold 1058 for the water supply through pipe 1062 to the spray manifold 1044. A pump 1060 supplies water for the primary 1050 and the secondary 1052 media through the pipes 1064.

The air velocity in this air washer section sub-stage is kept low enough to prevent moisture carryover to the final sub-stage. For a preferred embodiment, this may entail air velocity staying below 500 feet per minute. Excess water from this sub-stage sump 10261 will flow to the sump 10262 of the final stage of the heat exchanger where it will be used on that stage's wet side.

The final media sub-stage consists of media 1050, 1052 such as a cross-fluted design implemented in a cellulose paper, such as Munters "CELDEK"™, or implemented in glass matting, such as Munter's "GLASDEK"™, which is supplied with very clean water 1054, 1056, which has been cleansed with a one-micron filter. Since almost no evaporation occurs in this stage only a very small amount of water is needed, just that amount which is sufficient to maintain wetness throughout this section. Not only will this sub-stage remove any particulate matter which may have gotten past the prior sub-stage, it will also cause any dissolved solids which may have evaporated to again be re-dissolved and then flushed from the system.

A proprietary media may also be used in this stage. It is designed to allow the purified water to very effectively clean the air flowing through it and to not require frequent replacement. The water in this air washer section sub-stage will be passed through one time only and not used again in this sub-stage. This water will go to the sump 10261 of an indirect evaporative stage where it will be filtered before being used in that stage.

This use of this air washer relieves normal intake air filters of a great deal of their work. Before, their role was to remove all potential airborne particulate matter, which could be injurious to the gas turbine. Now they only need remove large particulate matter such as bugs, leaves, feathers and other large items, which could be harmful to the heat exchanger.

Advantageously, the air washer sub-stage will provide the cleanliness required by the turbine utilizing potable water only, without any de-ionized water. The use of normal potable water for cleaning the air is a great improvement over current practice, which requires more expensive de-ionized water as the basis of the method of achieving great cleanliness. Advantageously, it should be noted that the addition of water vapor to the cooled air fed to a gas turbine might have a significant impact in reducing emissions of NOx and other pollutants.

Figure 11:
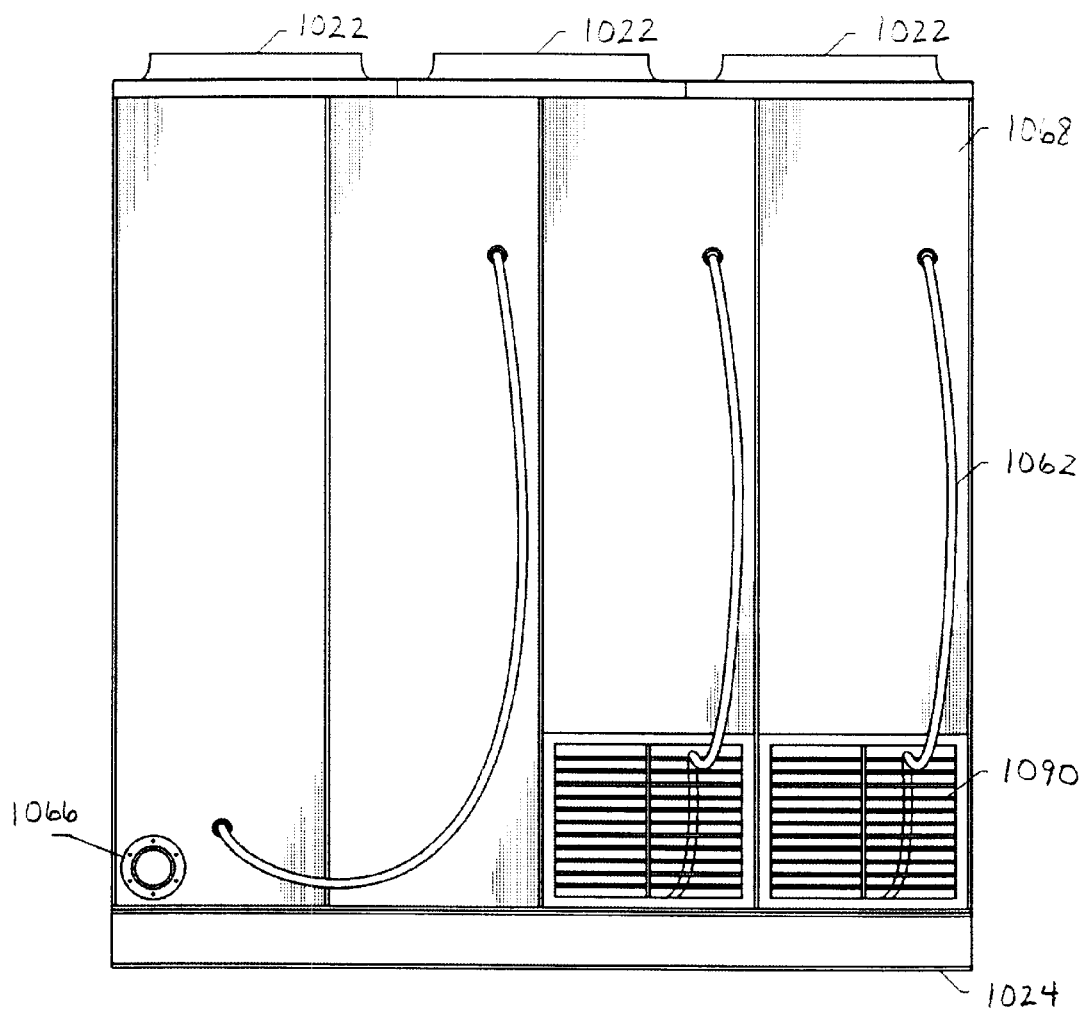
FIG. 11 shows a side view of unit described in FIG. 5, with the air intake on the left.

FIG. 11 shows a side view of unit described in FIG. 5, with the air intake on the right showing wet side fans 1022, foundation 1024, housing 1068, wet side air flow 1016, pipe from pump to spray manifold 1062 and access panel 1066.

Figure 12:
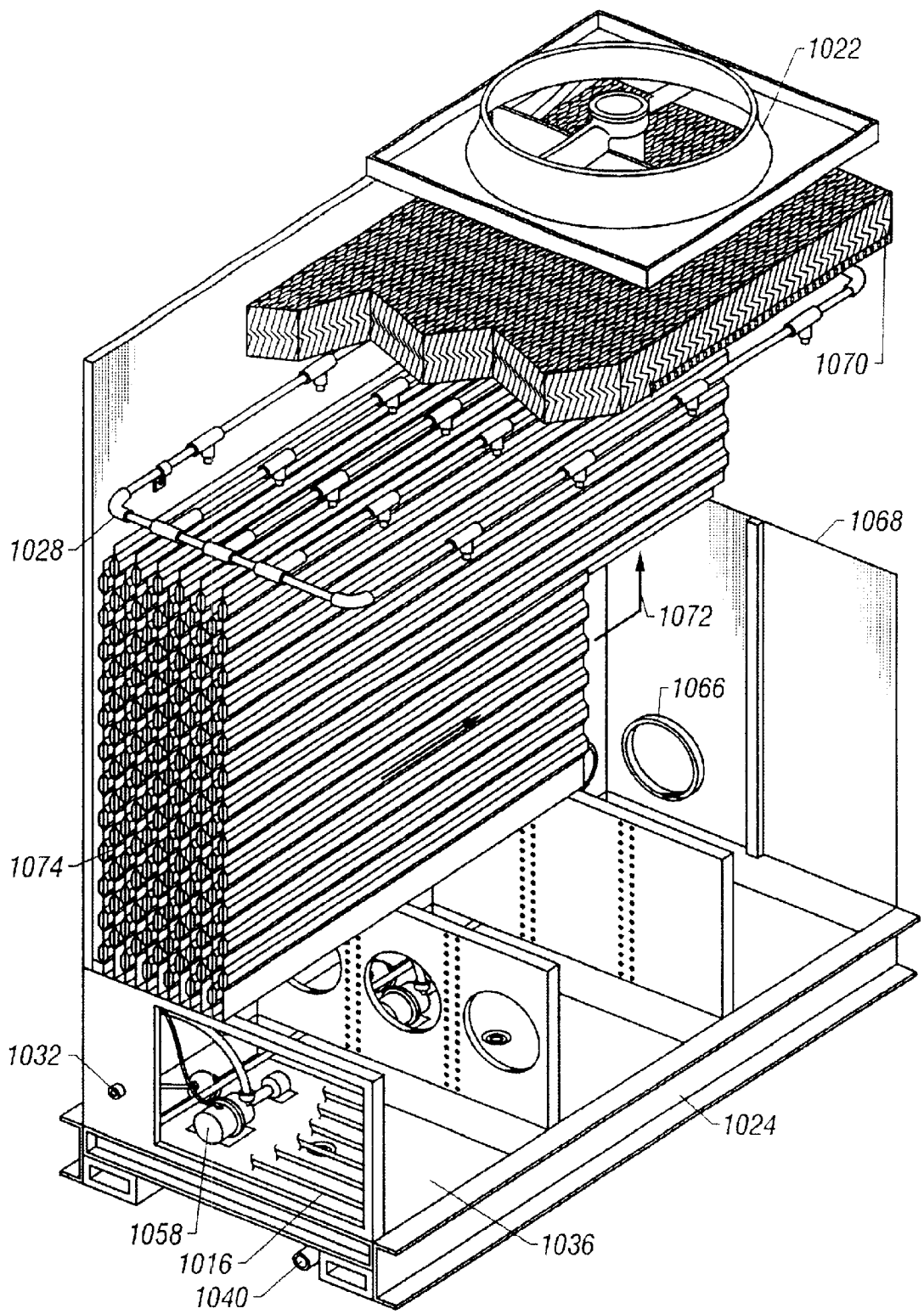
FIG. 12 shows an isometric section of the unit described in FIG. 5.

FIG. 12 shows an isometric section of the unit described in FIG. 5. The wet side air inflow 1016 is shown along with a float valve 1032, together with a pump for the spray manifold 1058, an overflow/drain pipe 1040, a sump 1036, the foundation 1026, the heat exchanger assembly 1074, the spray manifold 1028, housing 1068, access panel 1066, a wet side fan 1022, and the airflow path from primary to secondary air 1072.

Figure 13:
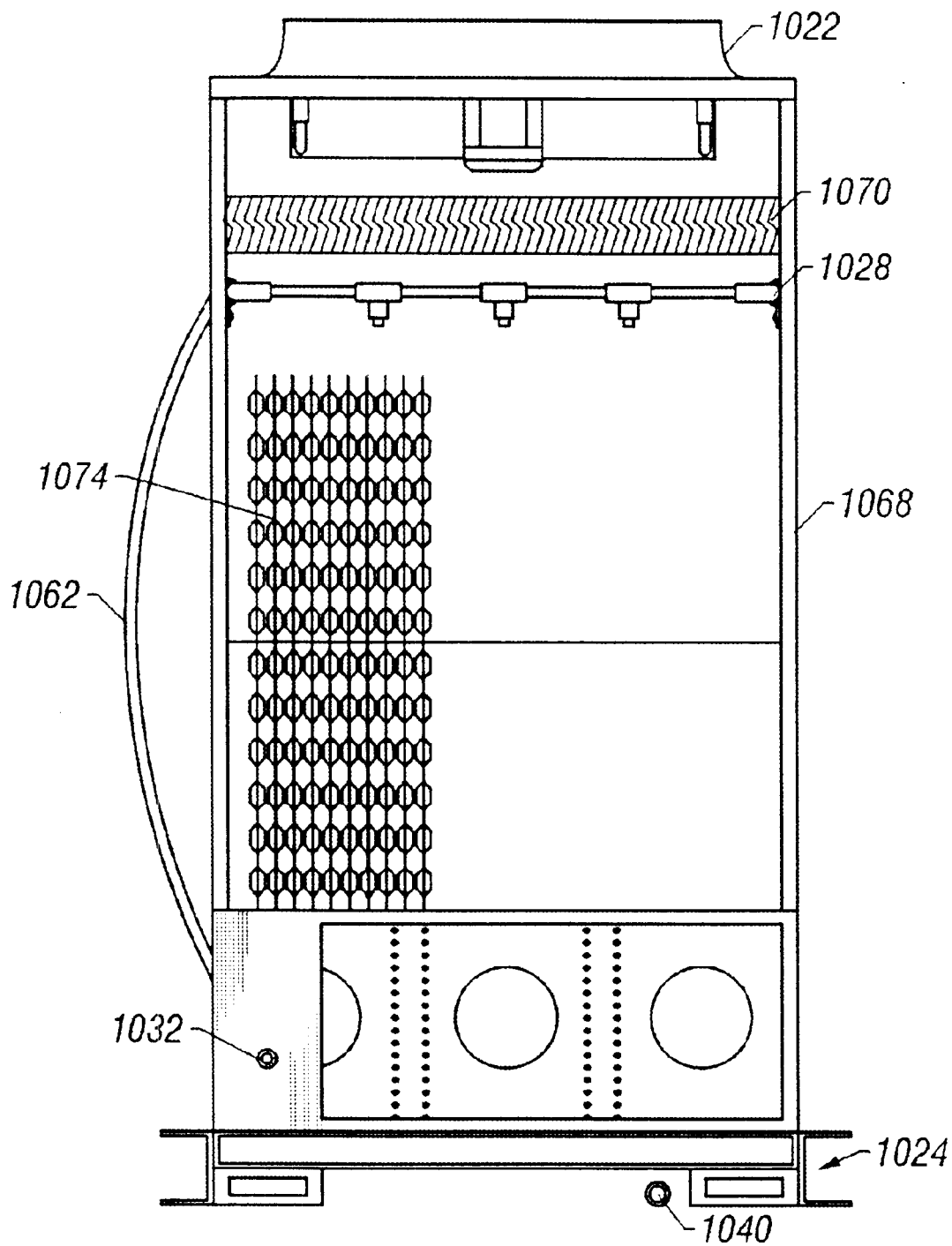
FIG. 13 shows an end view and section of intake of the unit described in FIG. 5.

FIG. 13 shows an end view and section of intake of the unit described in FIG. 5. The float valve 1032 may be seen, together with an overflow/drain pipe 1040, foundation 1024, housing 1068, the heat exchanger assembly 1074, a pipe from the pump to the spray manifold 1062, a spray manifold 1028, a wet side fan 1022 and a moisture eliminator 1070.

Figure 14:
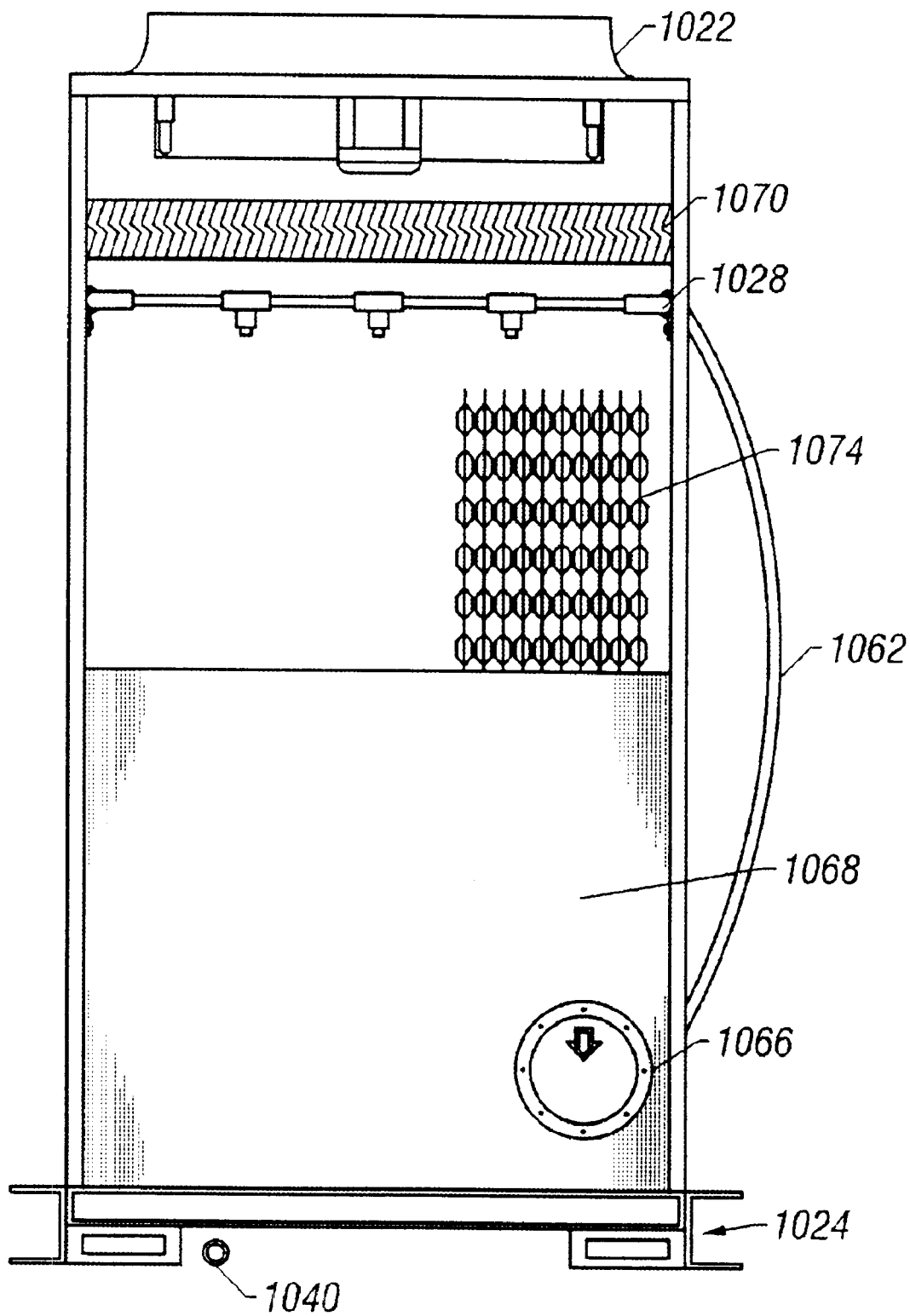
FIG. 14 shows an end view and section of discharge of the unit described in FIG. 5.

FIG. 14 shows an end view and section of discharge of the unit described in FIG. 5. The overflow/drain pipe 1040 may be seen, together with the foundation 1024, housing 1068, the heat exchanger assembly 1074, a pipe from the pump to the spray manifold 1062, a spray manifold 1028, a wet side fan 1022, access panel 1066 and a moisture eliminator 1070.

Figure 15:
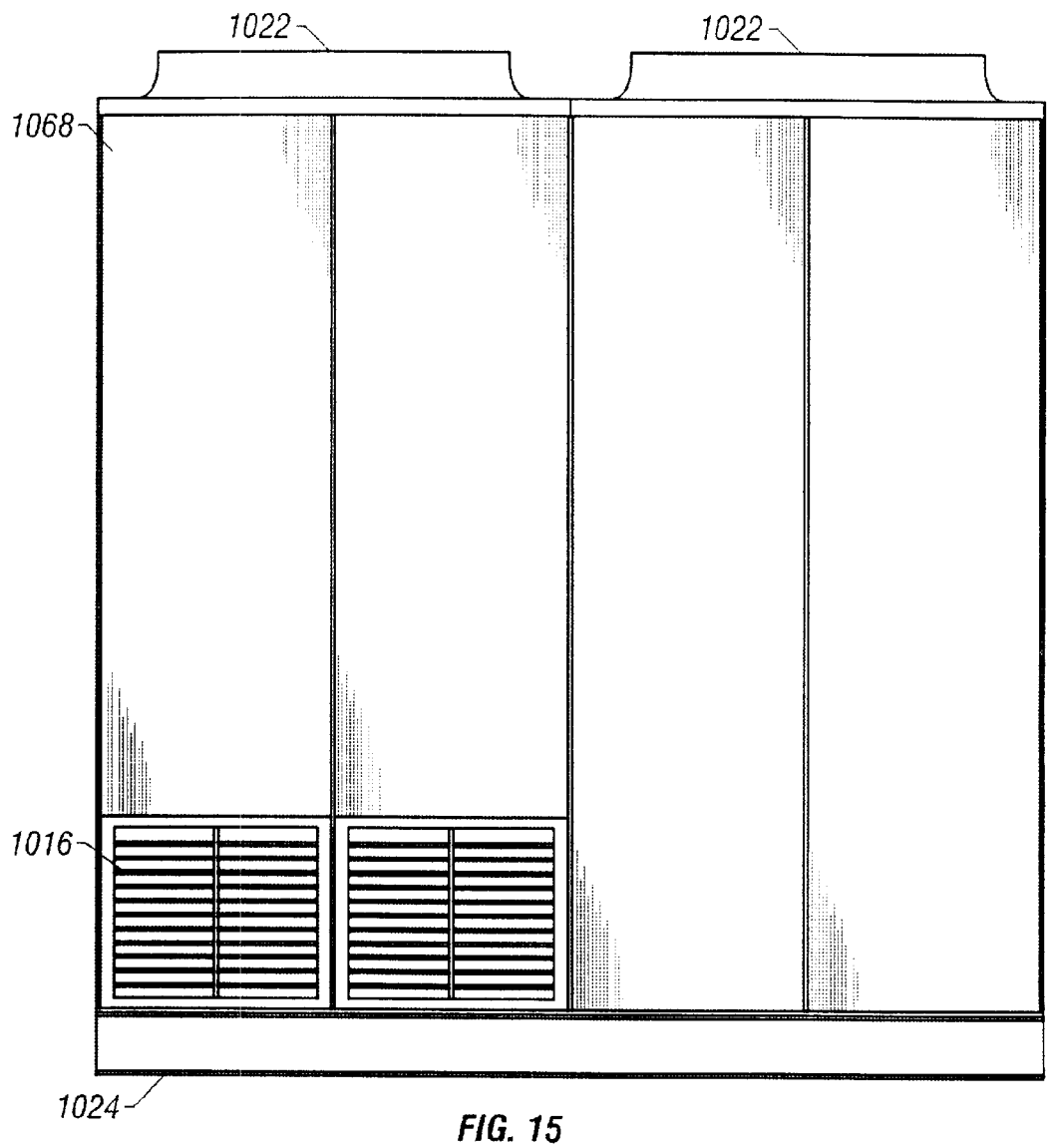
FIG. 15 shows a side view of unit described in FIG. 5, with the intake on right.

FIG. 15 shows a side view of unit described in FIG. 5, with the intake on left. The foundation 1024, wet side air flow in 1016, housing 1068 and wet side fans 1022 are shown.

Figure 16:
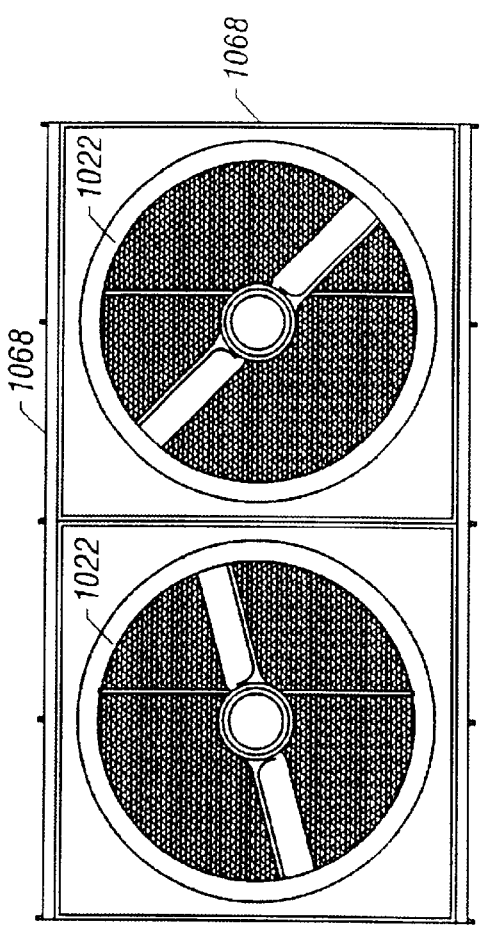
FIG. 16 shows a top view of the unit described in FIG. 5.

FIG. 16 shows a top view of the unit described in FIG. 5 with wet side fans 1022 and housing 1068.

Figure 17:
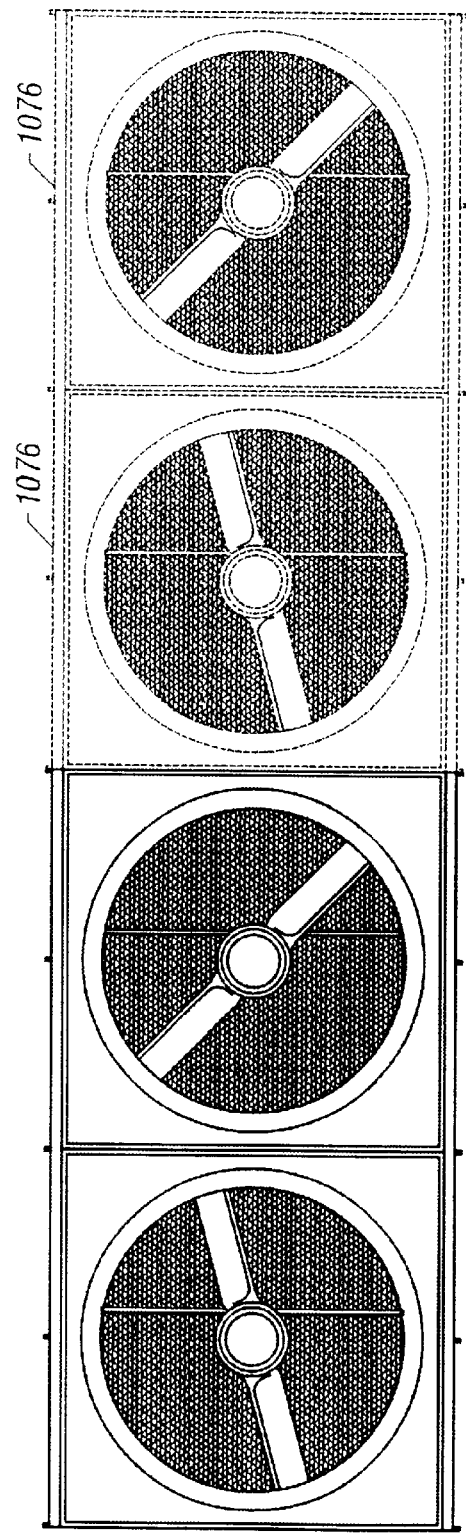
FIG. 17 shows a top view of the multi-stage unit shown in FIG. 6.

FIG. 17 shows a top view of the multi-stage unit shown in FIG. 6 with n-series units and components 1076 indicated.

Figure 18:
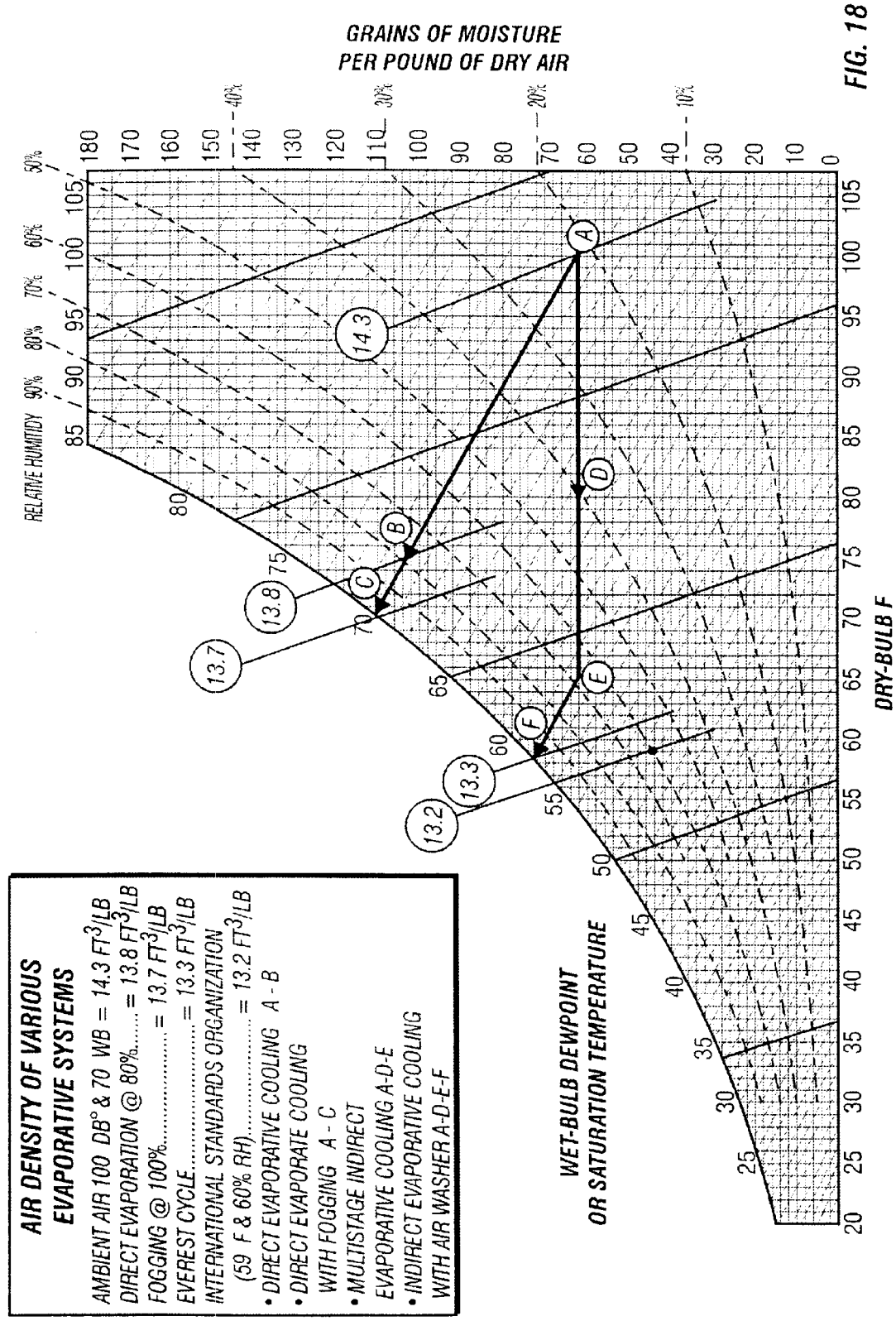
FIG. 18 shows a psychrometric chart depicting various evaporative cycles (direct evaporative cooling, direct evaporative cooling with fogging, multistage indirect evaporative cooling and indirect evaporative cooling with air washer) with comparisons relating to air density.

FIG. 18 shows a psychrometric chart depicting various evaporative cycles (direct evaporative cooling, direct evaporative cooling with fogging, multistage indirect evaporative cooling and indirect evaporative cooling with air washer) with comparisons relating to air density.

Figure 19:
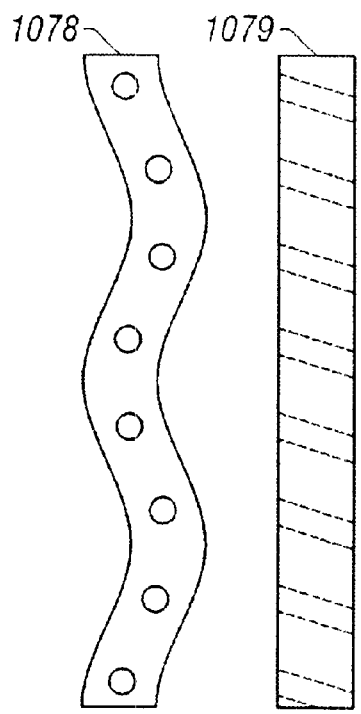
FIG. 19 shows plate dividers made with holes.
Figure 20:
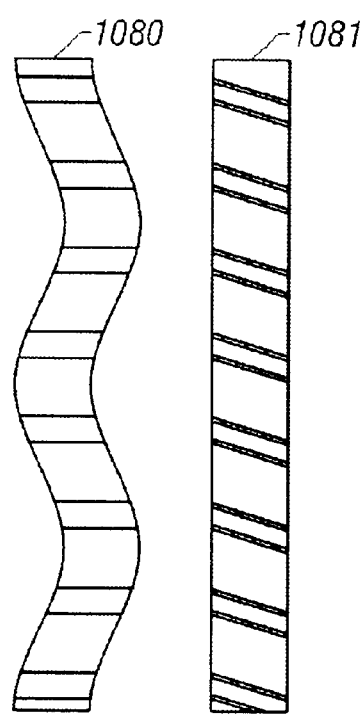
FIG. 20 shows plate dividers made with slats.
Figure 21:
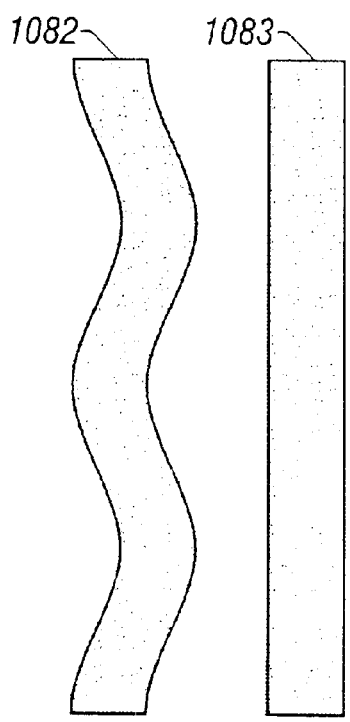
FIG. 21 shows plate dividers made with reticulated foam.
Figure 22:
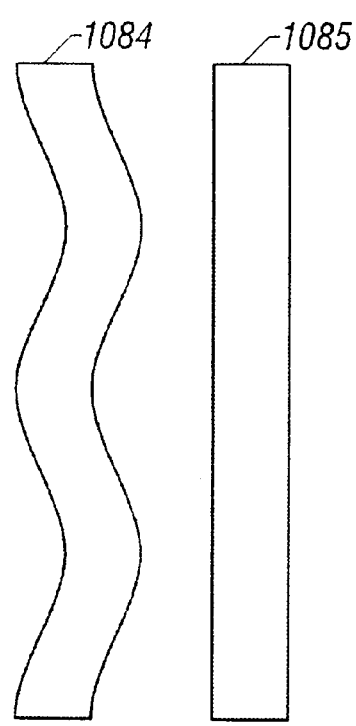
FIG. 22 shows solid plate dividers.

FIG. 19 shows plate dividers made with holes, including an end-on view 1078, and cross section 1079. FIG. 20 shows plate dividers made with slats, including an end-on view 1080 and a cross section 1081. FIG. 21 shows plate dividers made with reticulated foam, including an end-on view 1082 and a cross section 1083. FIG. 22 shows solid plate dividers, including an end-on view 1084 and a cross section 1085.

Figure 23:
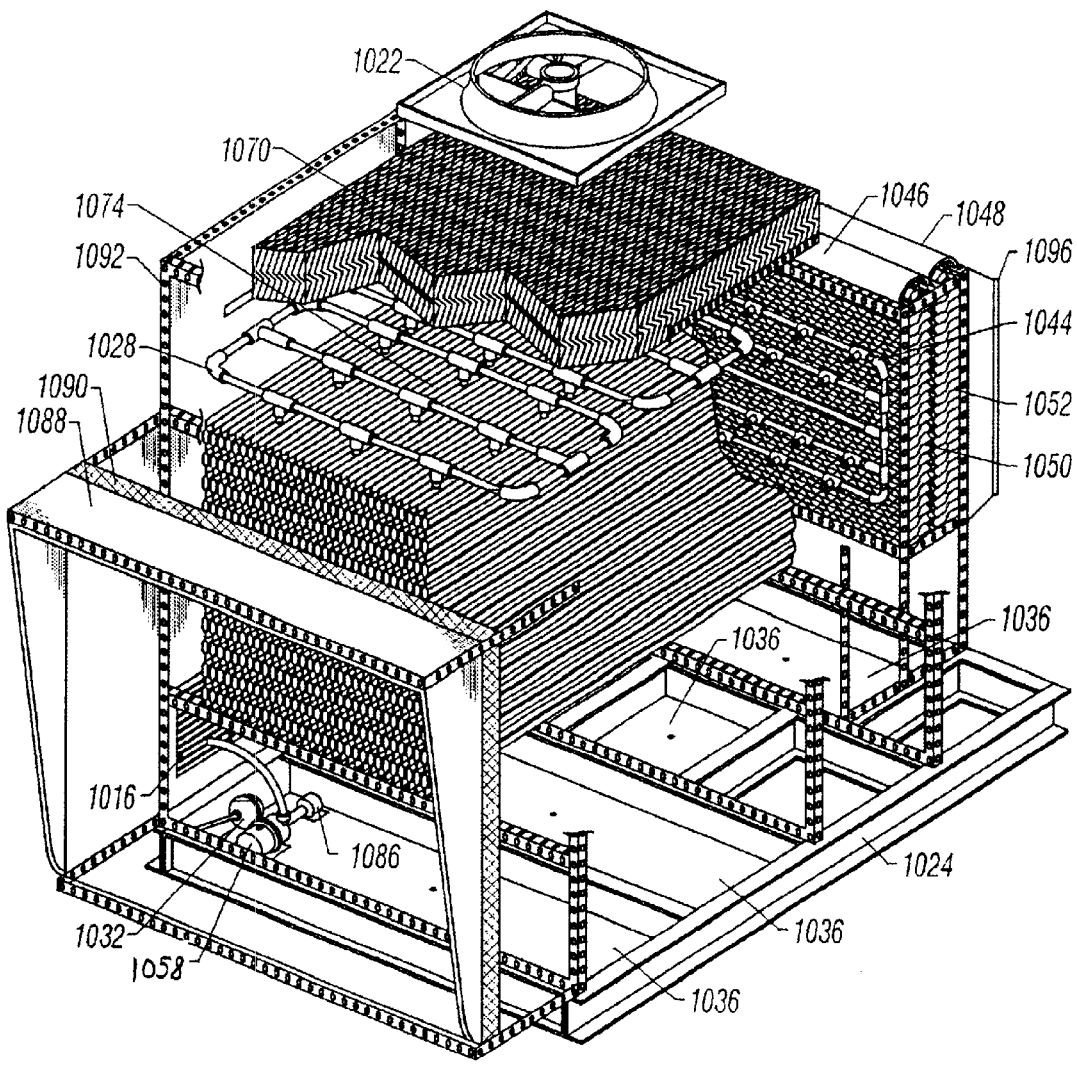
FIG. 23 shows an isometric section of unit depicted in FIG. 9 with item callouts.

FIG. 23 shows an isometric section of unit depicted in FIG. 9. It shows the wet side air inflow 1016 along with a float valve 1032, a strainer for the pump 1086, sumps 1036, the foundation 1024, the heat exchanger assembly 1074, the spray manifold 1028, framework 1092, intake air hood 1088, a wet side fan 1022, intake air filters 1090, moisture eliminator 1070, air washer cover for the primary media 1046, air washer cover for the secondary media 1048, air discharge housing 1096, air washer spray manifold 1044, primary evaporative media 1050, and the secondary evaporative media 1052.

Figure 24:
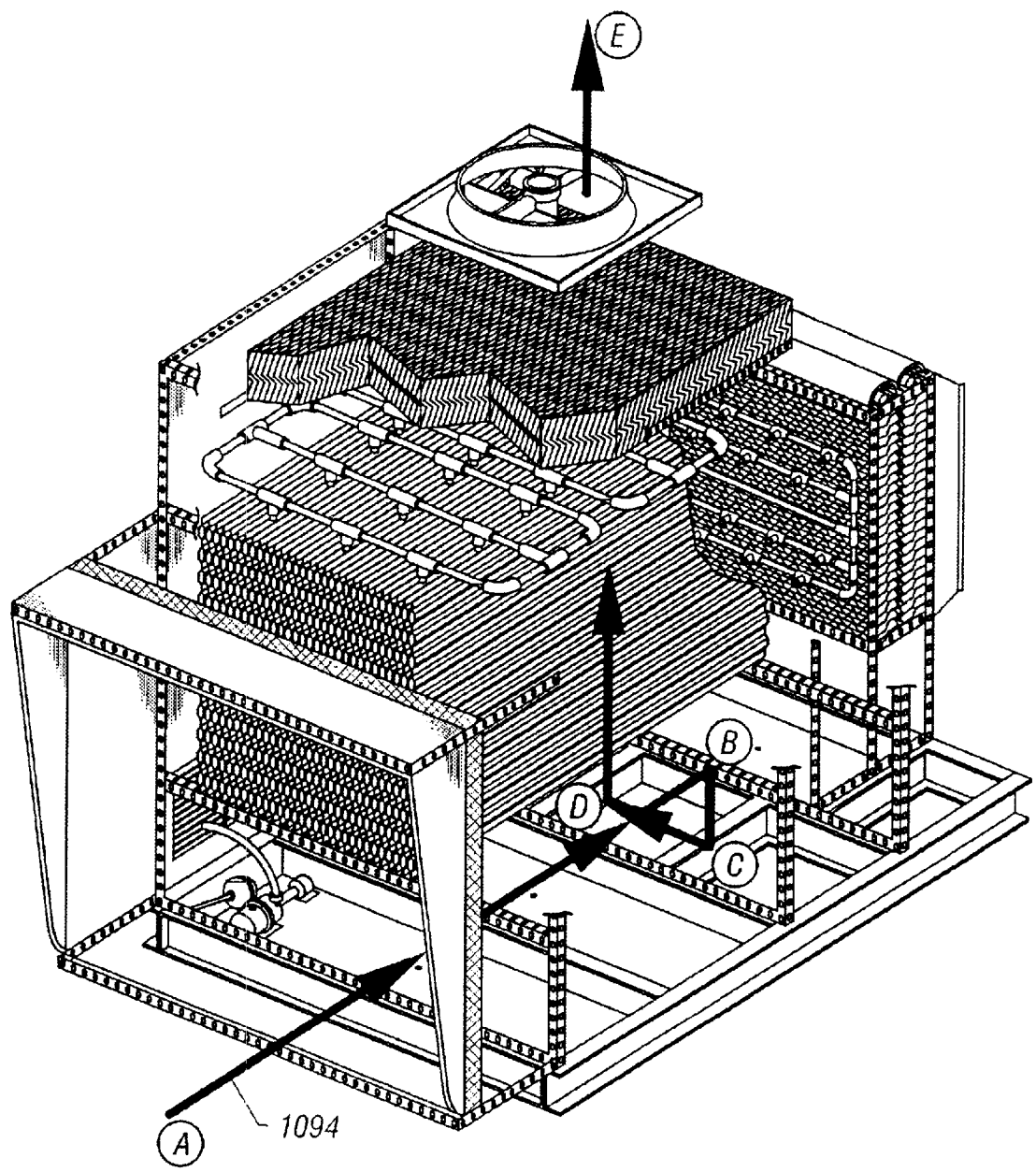
FIG. 24 shows an isometric section of unit described in FIG. 9 with air flow path depicted.

FIG. 24 shows an isometric section of unit described in FIG. 9 with airflow path depicted 1094. The airflow 1094 on the path A to B is the airflow entering the heat exchanger and flowing through to the plenum. On the next leg of flow, on path B to C, the flow is downward in the plenum. On the next leg of airflow, the path is C to D, from the plenum to the sump area. On the last leg of airflow shown, the path is from D to E, from the sump area upward through the wet side of the heat exchanger, into the atmosphere.

Figure 25:
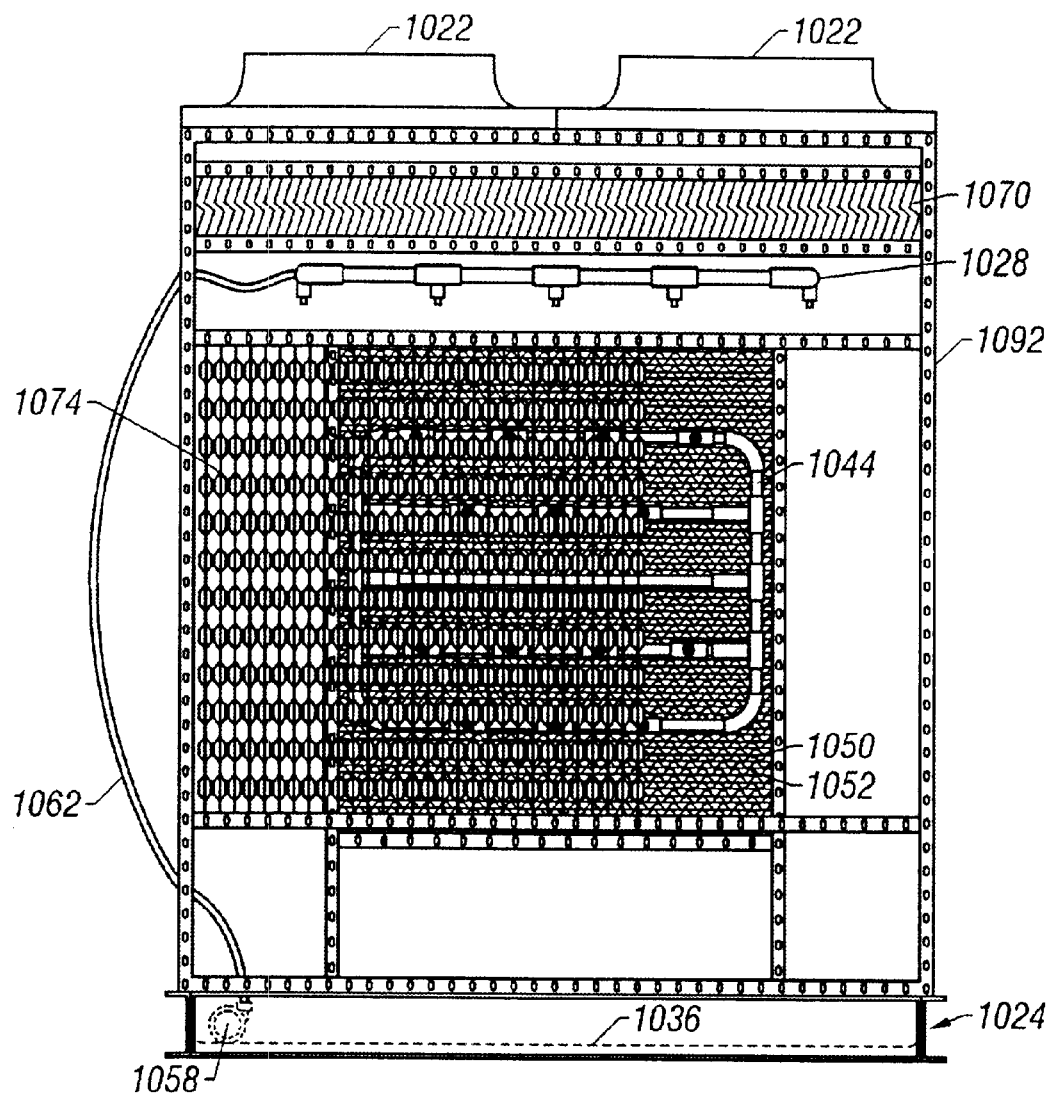
FIG. 25 shows a section of a unit described in FIG. 9, as viewed from intake end.

FIG. 25 shows a section of a unit described in FIG. 9, as viewed from intake end. It shows the foundation 1024, a pump for the spray manifold 1058, a pipe from the pump to the spray manifold 1062, sumps 1036, the heat exchanger assembly 1074, the spray manifold 1028, the framework 1092, wet side fans 1022, moisture eliminator 1070, an air washer spray manifold 1044, primary evaporative media 1050, and the secondary evaporative media 1052.

Figure 26:
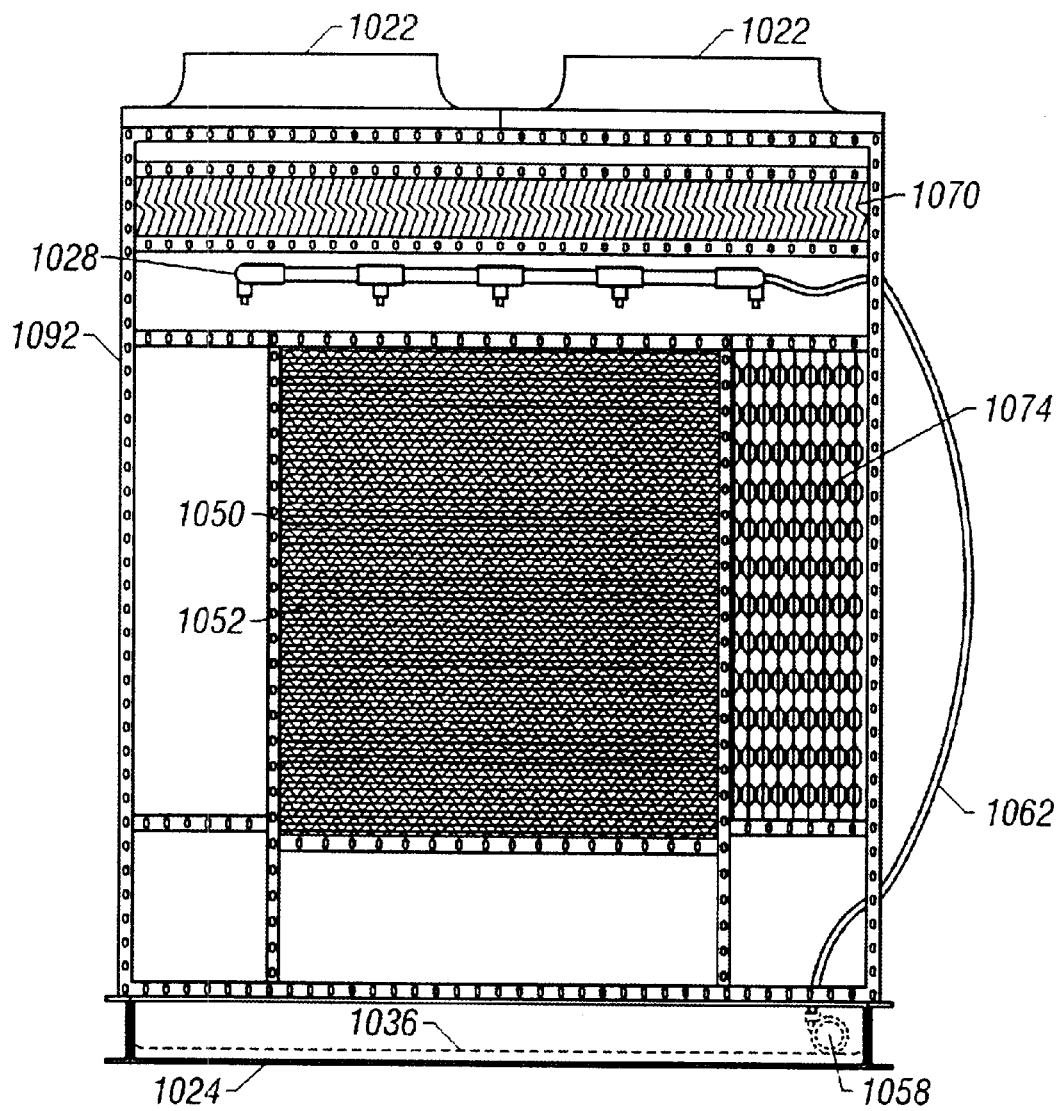
FIG. 26 shows a section of a unit described in FIG. 9, as viewed from discharge end.
Figure 27:
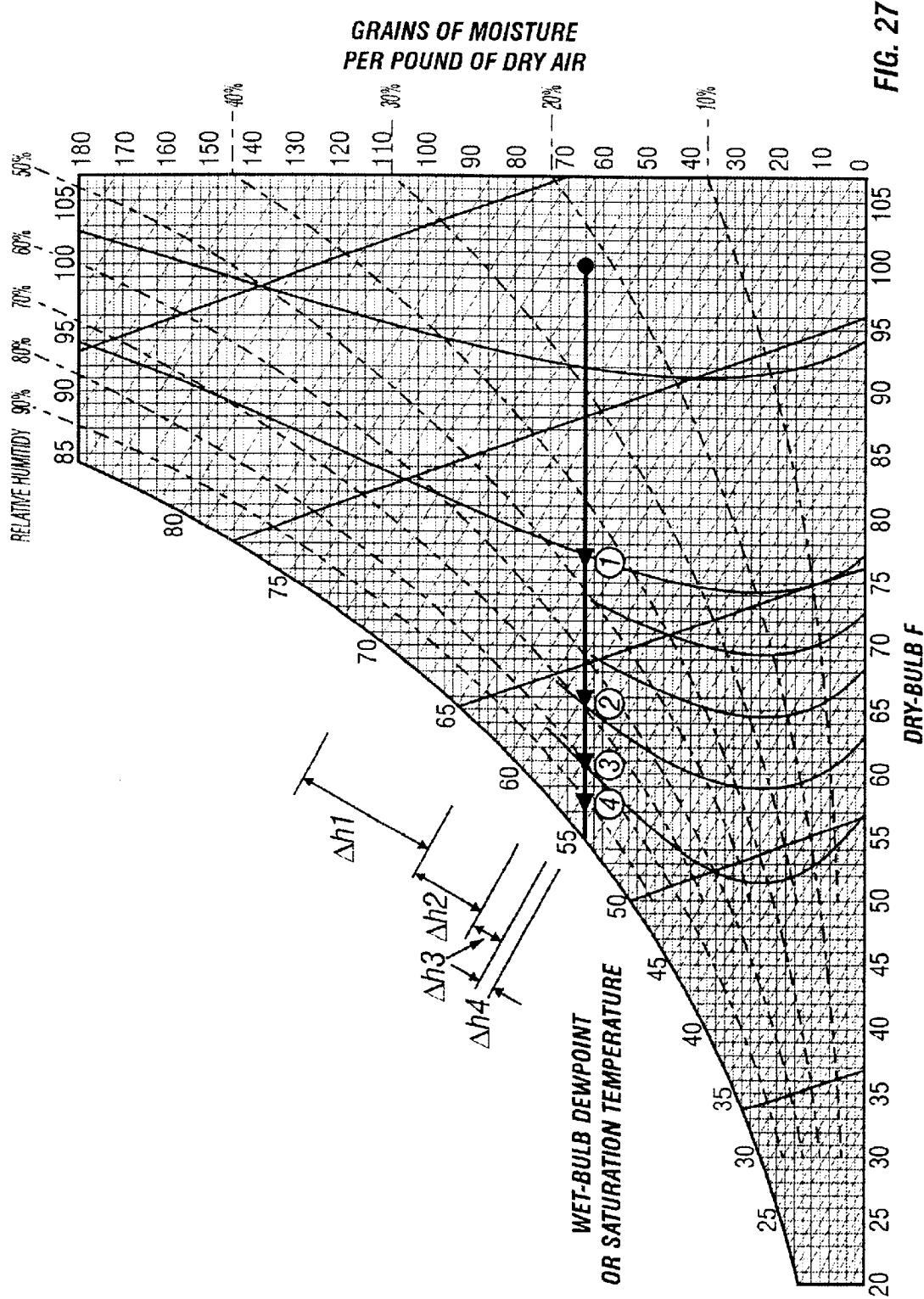
FIG. 27 shows a psychrometric chart depicting the thermodynamic path of an "n"-series arrangement of heat exchangers, for n=4.

FIG. 26 shows a section of a unit described in FIG. 9, as viewed from discharge end. It shows the foundation 1024, a pump for the spray manifold 1058, a pipe from the pump to the spray manifold 1062, sumps 1036, the heat exchanger assembly 1074, the spray manifold 1028, the framework 1092, wet side fans 1022, moisture eliminator 1070, primary evaporative media 1050, and the secondary evaporative media FIG. 27 shows a psychrometric chart depicting the thermodynamic path of an "n"-series arrangement of heat exchangers, for n=4. In the progressive lowering of the temperature from point 1 to point 2 to point 3 to point 4, the progressively smaller enthalpy changes are denoted, $\Delta h_1$, $\Delta h_2$, $\Delta h_3$, and $\Delta h_4$ where $\Delta h_2 > \Delta h_2 > \Delta h_3 > \Delta h_4$. This illustrates that the effect of n-stages converges rapidly during the first four to six multi-stages.

Figure 28:
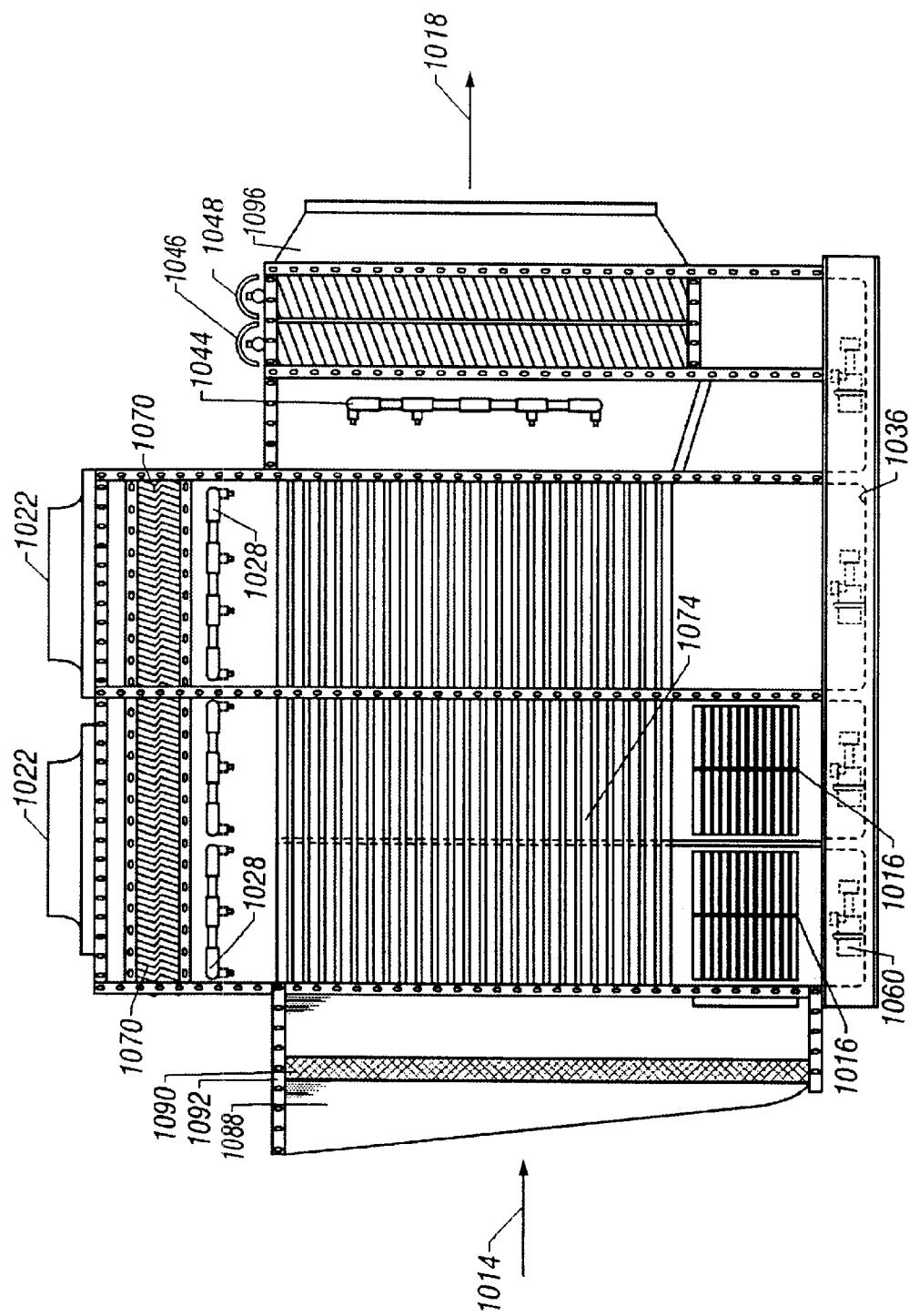
FIG. 28 shows a section of a unit described in FIG. 9, with item callouts.

FIG. 28 shows a section of a unit described in FIG. 9. It shows the foundation 1024, a pump for the spray manifold 1058, sumps 1036, the heat exchanger assembly 1074, the spray manifold 1028, the framework 1092, wet side fans 1022, moisture eliminator 1070, an air washer spray manifold 1044, air washer cover 1046 for the primary evaporative media, air washer cover 1048 for the secondary evaporative media and the air discharge housing 1096. It also shows the wet side air inflow 1016, the dry side inward airflow 1014, the dry air outflow 1018, pumps for the spray media 1060, intake air hood 1088 and intake air filters 1090.

Advantageously, this invention utilizes more airflow 1016 (FIG. 28) on the wet side as compared to the dry side 1014. This greater airflow on the wet side relative to the dry side creates a much higher thermal efficiency. Air from the wet side, which is not recirculated to the dry side, in circumstances where that is done, or otherwise utilized, is dumped to the atmosphere 1020 (FIG. 5). In this invention, there is no need to keep the airflow on the wet side comparable to that on the dry side. Therefore, the relative rate of flow of wet side air to dry side airflow can be chosen to attempt a highest feasible efficiency.

While in the past heat exchangers tended to utilize tubes or a semi-rectangular shape arranged vertically and tended to have header sheets at each end to keep the primary and secondary air flows separated, the new shape can be utilized in either vertical or horizontal applications.

When used as a pre-cooler for gas turbines the preferred method is to have the tubes horizontal, in the direction of airflow to the gas turbine intake. In this situation, the length of the plates can be adjusted to provide sound attenuation as "tuned lengths" to damp out specific frequencies. Additionally, the heat exchanger can be made up of two or more sections each of a different length so that several frequencies can be damped out. A further embodiment utilizes a space or plenum between heat exchanger sections, these sections acting as expansion chambers to further dampen the noise, and sound attenuation devices can also be installed in these expansion chambers.

What is described is a complete, unique, system for cooling and cleaning the air being used by a gas turbine. This cycle is far more efficient than any system now on the market or even contemplated in any theoretical literature. The psychrometric chart (FIG. 11) shows graphically how this technology advantageously compares with other technologies and how on a normal warm day in semi-arid regions can provide air at a density almost equal to IS0 conditions. From the starting point of nominal ambient conditions of temperature of about 100° F. (point A, FIG. 18) and a wet bulb temperature of about 70° F. (point A, FIG. 18) with a relative humidity of about 22% (point A, FIG. 18), one can reach a dry bulb temperature for the cooled air of about 65° F. (point E, FIG. 18). Starting at (point A, FIG. 18), one can move along a line of constant moisture or water content to (point E, FIG. 18) by indirect evaporative cooling. In the indirect evaporative cooling, moisture is not being taken out of the "dry" side air. Direct evaporative cooling, where the enthalpy, or sensible heat is constant is not added, leads to a wet bulb temperature of about 58° F. (point F, FIG. 18). In the multi-stage process, under the same approximate conditions, one may achieve about a dry bulb temperature of about 53.5° F., with a less consumption of energy, because the n-stage process operates more efficiently.

While the invention herein disclosed has been described by means of specific embodiments and applications thereof, numerous modifications and variations could be made thereto by those skilled in the art without departing from the scope of the invention set forth in the claims.

It is claimed that:

1. An evaporative apparatus for cooling comprising:
   at least two improvements elected from the group consisting of:
   (a) a first multi-stage indirect evaporative cooling heat exchanger; wherein said first multi-stage indirect evaporative cooling heat exchanger is linkable with a second multi-stage indirect evaporative cooling heat exchanger; wherein cool output of said first heat exchanger feedable to input of said second heat exchanger; wherein
   cool output from said second and said first linked heat exchangers combination is approximately additive of cool outputs of said second and said first linked heat exchangers individually;
   (b) a multi-substage direct evaporative cooling stage; wherein there are one or more air cleaning sub-stages of said multi-sub-stage direct evaporative stage;
   (c) multi-stage sumps wherein each sump stage, in a corresponding relationship to a stage of an indirect evaporative cooling heat exchanger, can contain sump water at different temperatures; wherein
   said separate sumps are sufficiently thermally insulated from each other to maintain different sump temperatures;
   (d) a multistage indirect evaporative cooling heat exchanger; wherein at least a last stage of said heat exchanger utilizes a portion of a dry side air flow to enter the wet side evaporative airflow; wherein said air has been sensibly cooled relative to, and is at a lower wet bulb temperature than, the ambient air;
   (e) an evaporative apparatus including parts of said wet side and dry side channels further comprising at least one assistant selected from the group consisting of air turbulence generation assistants, moist air turbulence generation assistants, water film surface increase assistants and water film droplet formation assistants;
   (f) dry side and wet side channels formed by placing in an opposed sense, pre-shaped sheets of thermally conductive material together; wherein said pre-shaped sheets are selected from the group consisting of polygonal channeled pre-shaped sheets and sinusoidal-corrugated channeled pre-shaped sheets.

2. The evaporative apparatus as in claim 1 further comprising:
   a pre-cooler for gas turbine further comprising:
   (a) horizontal tubes, in the direction of air flow to the gas turbine intake; wherein said length of the plates adjusted to provide sound attenuation to damp out specific frequencies.

3. The evaporative apparatus as in claim 2 further comprising:
   a pre-cooler for gas turbine further comprising:
   (a) heat exchanger fabricated as two or more sections; wherein each section is of a different length thereby several frequencies can be damped out.

4. The evaporative apparatus as in claim 3 further comprising:
   a pre-cooler for gas turbine further comprising:
   a plenum between heat exchanger sections; wherein said plenum(s) sections acting as expansion chambers to further dampen the noise.

5. The evaporative apparatus as in claim 4 further comprising:
   a pre-cooler for gas turbine further comprising:
   sound attenuation devices installed in said expansion chambers.

6. An evaporative apparatus comprising:
   (a) a multi-substage direct evaporative cooling stage;
   (b) one or more air cleaning sub-stages of said multi-sub-stage direct evaporative stage;
   (c) a first multi-stage indirect evaporative cooling heat exchanger;
   (d) said first multi-stage indirect evaporative cooling heat exchanger linkable with a second multi-stage indirect evaporative cooling heat exchanger;
   (e) output of said first heat exchanger feedable to input of said second heat exchanger;
   (f) cool output from said second and said first linked heat exchangers combination is approximately additive of cool outputs of said second and said first linked heat exchangers individually;
   (g) multi-stage sumps wherein each sump stage, in a corresponding relationship to a stage of said indirect evaporative cooling heat exchanger, can contain sump water at different temperatures;

(h) said separate sumps are sufficiently thermally insulated from each other to maintain different sump temperatures.

7. The evaporative apparatus as in claim 6 further comprising:

(a) cascaded sumps; wherein makeup water is supplied to a last sump according to a measured level in a first sump;

(b) said cascaded sumps connected by a standpipe which can transfer water between at least two sumps.

8. The evaporative apparatus as in claim 7 further comprising:

an external ambient water supply for automatically maintaining designated sump water levels.

9. The evaporative apparatus as in claim 7 further comprising:

a water supply from an air washer stage of said evaporative apparatus for automatically maintaining designated sump water levels.

10. The evaporative apparatus as in claim 6 further comprising:

a multistage indirect evaporative cooling heat exchanger; wherein at least a last stage of said heat exchanger utilizes a portion of a dry side air flow to enter the wet side evaporative airflow; wherein said air has been sensibly cooled relative to, and is at a lower wet bulb temperature than, the ambient air.

11. The evaporative apparatus as in claim 10 further comprising:

a multi-stage indirect evaporative cooling heat exchanger further comprising:

(a) a dry side wherein originally ambient air is cooled without direct contact with evaporating water;

(b) a wet side wherein air is used to directly evaporate water; thereby producing cooling;

(c) a thermally conductive material separating said dry side and said wet side; thereby the cooler side tends to warm and the warmer side tends to cool;

(d) dry side and wet side channels formed by thermally conductive material;

wherein the placement of said material forms channels for guiding said dry side air and said wet side air; thereby said wet airs containing moisture of some amount and said dry air containing moisture of some other or same amount.

12. The evaporative apparatus as in claim 11 further comprising:

said dry side and wet side channels formed by placing in an opposed sense, polygonal channeled pre-shaped sheets of thermally conductive material together.

13. The evaporative apparatus as in claim 11 further comprising:

said dry side and wet side channels formed by placing in an opposed sense, sinusoidal-corrugated channeled pre-shaped sheets of thermally conductive material together.

14. The evaporative apparatus as in claim 12 or 13 further comprising:

said sheets separated to a required distance by separators inserted between said sheets.

15. The evaporative apparatus as in claim 12 or claim 13 further comprising:

said sheets fabricated from one or more materials selected from the group consisting of steel, galvanized iron, galvanized steel, stainless steel, thermally conductive plastic, thermally conductive ceramic, metal coated with paint, metal coated with varnish, metal coated with plastic, metal coated with ceramic, metal coated with glass, metal coated with diamond-like coating, titanium, thermally conductive composite, aluminum, magnesium, copper and silver.

16. The evaporative apparatus as in claim 11 further comprising:

parts of said wet side and dry side channels further comprising (a) air turbulence generation assistants;

(b) moist air turbulence generation assistants;

(c) water film surface increase assistants;

(d) water film droplet formation assistants.

17. The assistants as in claim 16 further comprising:

(a) embossed surface of sheets forming wet side channels;

(b) tabs partially cut and foldably bent from sheets forming wet side channels;

(c) tabs attached to said sheets forming wet side channels;

(d) material attached; wherein said material is in a structurally open form.

18. The material attached as in claim 17 further comprising:

a material selected from the group comprising sintered metal powder and foamed metal.

19. The evaporative apparatus as in claim 6 further comprising:

(a) one or more water-spray direct evaporative cooling stage;

(b) a final wetted media stage; wherein air flowing through one or more media of the evaporative apparatus is cleaned.

20. The evaporative apparatus as in claim 6 further comprising:

(a) a water purifier, comprising:

(b) a water evaporator heated by a hot turbine exhaust, so as to distill water supplied thereto;

(c) a condenser disposed in the path of the wet side exhaust of the indirect evaporative heat exchanger for liquefying said distilled water vapor;

(d) means for conveying distilled water vapor from the evaporator to the condenser; and (e) means for conveying liquefied water from the condenser to said water spray.

21. An evaporative apparatus for cooling comprising:

(a) a multi-stage indirect evaporative cooling heat exchanger;

(b) One or more water-spray direct evaporative cooling stage;

(c) a final wetted media stage; wherein air flowing through one or more media of the evaporative apparatus is cleaned;

(d) a multi-stage sump wherein each sump stage, in a corresponding relationship to a stage of said multi-stage, can contain sump water at different temperatures.

22. Humidifier and scrubber means for cooling and washing intake air to improve the performance of a gas turbine system, said system including a combustion chamber, a turbine exhausting hot gas and an air compressor for compressing ambient air to supply the combustion chamber with compressed air, said means comprising:

(a) an indirect evaporative multi-stage heat exchanger having a dry side, a wet side and an exhaust from said wet side;

(b) a water spray;

(c) means for conveying ambient air through the dry side of the indirect evaporative heat exchanger to sensibly cool said air;

(d) means for conveying said sensibly cooled air through said water spray to clean, humidify and further cool said air;

(e) multi-stage means for collecting water that has not evaporated in the air stream;

(f) means for conveying said humidified air to said turbine air compressor;

(g) a water purifier, comprising:

(h) a water evaporator heated by the hot turbine exhaust, so as to distill water supplied thereto;

(i) a condenser disposed in the path of the wet side exhaust of the indirect evaporative heat exchanger for liquifying said distilled water vapor;

(j) means for conveying distilled water vapor from the evaporator to the condenser; and (k) means for conveying liquified water from the condenser to said water spray.

23. A method for cooling and cleaning ambient air for intake use in a gas turbine system, said system including a combustion chamber, a turbine exhausting hot gas and an air compressor for compressing ambient air to supply the combustion chamber with compressed air, comprising:

(a) sensibly cooling said ambient air with an indirect multi-stage evaporative heat exchanger of the type having a dry side, a wet side and an exhaust from said wet side;

(b) evaporating water with excess heat from the gas turbine system;

(c) condensing said evaporated water by heat transfer with the wet side exhaust from the indirect evaporative heat exchanger to form purified water for a water spray;

(d) cleaning and further cooling adiabatically said sensibly cooled air with said water spray;

(e) collecting water in a multi-stage collector that has not evaporated in the air stream; and (f) directing said cooled, cleaned air to the intake of the compressor of the gas turbine.

24. A method for making an evaporative apparatus for cooling comprising the step of selecting at least three lettered steps from the group comprising:

(a) assembling a first multi-stage indirect evaporative cooling heat exchanger, further comprising the steps of: linking said first multi-stage indirect evaporative cooling heat exchanger with a second multi-stage indirect evaporative cooling heat exchanger; feeding output of said first heat exchanger to input of said second heat exchanger; adding cool output from said second and said first linked heat exchangers combination so as to achieve a cooling approximately additive of cooling of said second and said first linked heat exchangers, individually;

(b) assembling a multi-stage evaporative cooling heat exchanger; further comprising the steps of: assembling a multi-sub-stage direct evaporative cooling stage; assembling one or more air cleaning sub-stages of said multi-sub-stage direct evaporative stage;

(c) containing sump water in multi-stage sumps wherein each sump stage, in a corresponding relationship to a stage of said indirect evaporative cooling heat exchanger, can contain sump water at different temperatures, further comprising the steps of: insulating said separate sumps sufficiently thermally from each other; maintaining different sump temperatures;

(d) utilizing, a portion of a dry side air flow (from a at least a last stage of a multistage indirect evaporative cooling heat exchanger) to enter the wet side evaporative airflow, further comprising the steps of: cooling said air sensibly relative to ambient air, whereby said air is at a lower wet bulb temperature than ambient air;

(e) generating air turbulence with turbulence producing assistants, further comprising the steps of: generating moist air turbulence with turbulence producing assistants; increasing water film surface with surface increasing assistants; forming water film droplets with droplet forming assistants;

(f) forming said dry side and wet side channels by placing in an opposed sense, channeled pre-shaped sheets of thermally conductive material together.

25. A method for making an evaporative apparatus comprising the steps of:

(a) assembling a first multi-stage indirect evaporative cooling heat exchanger;

(b) linking said first multi-stage indirect evaporative cooling heat exchanger with a second multi-stage indirect evaporative cooling heat exchanger;

(c) feeding output of said first heat exchanger to input of said second heat exchanger;

(d) adding cool output from said second and said first linked heat exchangers combination so as to achieve a cooling approximately additive of cooling of said second and said first linked heat exchangers, individually;

(e) containing sump water in multi-stage sumps wherein each sump stage, in a corresponding relationship to a stage of said indirect evaporative cooling heat exchanger, can contain sump water at different temperatures;

(f) insulating said separate sumps sufficiently thermally from each other (g) maintaining different sump temperatures.

26. The method for making an evaporative apparatus as in claim 25 further comprising the steps of:

(a) cascading sumps;

(b) supplying makeup water to a last sump according to a measured level in a first sump;

(c) connecting said cascaded sumps by a standpipe;

(d) transferring water between at least two sumps.

27. The method for making an evaporative apparatus as in claim 25 further comprising the step of:

supplying external ambient water for automatically maintaining designated sump water levels.

28. The method for making an evaporative apparatus as in claim 25 further comprising the steps of:

supplying water from an air washer stage of said evaporative apparatus for automatically maintaining designated sump water levels.

29. The method for making an evaporative apparatus as in claim 25 further comprising the steps of:

(a) utilizing, a portion of a dry side air flow (from a at least a last stage of a multistage indirect evaporative cooling heat exchanger) to enter the wet side evaporative airflow;

(b) cooling said air sensibly relative to ambient air, whereby said air is at a lower wet bulb temperature than ambient air.

30. The method for making an evaporative apparatus as in claim 25 further comprising the steps of:

fabricating a multi-stage indirect evaporative cooling heat exchanger further comprising the steps of:
(a) utilizing a dry side wherein originally ambient air is cooled without direct contact with evaporating water;
(b) utilizing a wet side wherein air is used to directly evaporate water; thereby producing cooling;
(c) utilizing a thermally conductive material separating said dry side and said wet side; thereby the cooler side tends to warm and the warmer side tends to cool;
(d) forming dry side and wet side channels from thermally conductive material;
(e) placing said material
(f) forming channels for guiding said dry side air and said wet side air; thereby said wet air containing moisture of some amount and said dry air containing moisture of some other or same amount.

31. The method for making an evaporative apparatus as in claim 25 further comprising the steps of:
(a) forming said dry side and wet side channels
(b) placing in an opposed sense, polygonal channeled pre-shaped sheets of thermally conductive material together.

32. The method for making an evaporative apparatus as in claim 31 further comprising the steps of:
(a) forming said dry side and wet side channels
(b) placing in an opposed sense, sinusoidal (corrugated) channeled pre-shaped sheets of thermally conductive material together.

33. The method for making an evaporative apparatus as in claim 31 or 32 further comprising the step of:
inserting separators between said sheets to set a required distance of separation.

34. The method for making an evaporative apparatus as in claim 31 or 32 further comprising the step of:
fabricating said sheets from one or more materials selected from the group consisting of steel, galvanized iron, galvanized steel, stainless steel, thermally conductive plastic, thermally conductive ceramic, metal coated with paint, metal coated with varnish, metal coated with plastic, metal coated with ceramic, metal coated with glass, metal coated with diamond-like coating, titanium, thermally conductive composite, aluminum, magnesium, copper and silver.

35. The method for making an evaporative apparatus as in claim 30 further comprising the steps of:
(a) generating air turbulence with turbulence producing assistants;
(b) generating moist air turbulence with turbulence producing assistants;
(c) increasing water film surface with surface increasing assistants;
(d) forming water film droplets with droplet forming assistants.

36. The method for making the assistants as in claim 35 further comprising the steps of:
(a) embossing surface of sheets forming wet side channels;
(b) cutting tabs partially and folding and bending said tabs from sheets forming wet side channels;
(c) attaching other tabs to said sheets forming wet side channels;
(d) attaching material; wherein said material is in a structurally open form.

37. The method for making an evaporative apparatus as in claim 36 further comprising the step of:
selecting a material from the group comprising sintered metal powder and foamed metal.

38. The method for making an evaporative apparatus as in claim 25 further comprising the steps of:
(a) assembling a multi-stage indirect evaporative cooling heat exchanger
(b) utilizing one or more water-spray direct evaporative cooling stages;
(c) utilizing a final wetted media stage; wherein air flowing through one or more media of the evaporative apparatus is cleaned;
(d) utilizing a multi-stage sump wherein each sump stage, in a corresponding relationship to a stage of said multi-stage, can contain sump water at different temperatures.

39. The method for making an evaporative apparatus as in claim 25 further comprising the steps of:
assembling a water purifier, further comprising:
(a) heating a water evaporator by the hot turbine exhaust, so as to distill water supplied thereto;
(b) disposing a condenser in the path of the wet side exhaust of the indirect evaporative heat exchanger for a purpose of liquefying;
(c) liquefying said distilled water vapor;
(d) conveying distilled water vapor from the evaporator to the condenser, by a means; and
(e) conveying liquefied water from the condenser to said water spray, by a means.

40. The method for making a humidifier and scrubber means for cooling and washing intake air to improve the performance of a gas turbine system, comprising the steps of:
(a) including a combustion chamber;
(b) utilizing a turbine exhausting hot gas;
(c) compressing ambient air with an air compressor; supply the combustion chamber with compressed air, further comprising the steps of:
(i) utilizing an indirect evaporative multi-stage heat exchanger having a dry side, a wet side and an exhaust from said wet side;
(ii) spraying water;
(iii) conveying ambient air through the dry side of the indirect evaporative heat exchanger to sensibly cool said air;
(iv) conveying said sensibly cooled air through said water spray to clean, humidify and further cool said air;
(v) collecting water that has not evaporated in the air stream utilizing multi-stage means;
(vi) conveying said humidified air to said turbine air compressor;
(vii) purifying water, further comprising:
(1) evaporating water heated by the hot turbine exhaust;
(2) distilling water supplied thereto;
(3) liquefying said distilled water vapor utilizing a condenser;
(4) disposing said condenser in the path of the wet side exhaust of the indirect evaporative heat exchanger;
(5) conveying distilled water vapor from the evaporator to the condenser; and
(6) conveying liquefied water from the condenser to said water spray.

* * * * *